(12) United States Patent
Iwane

(10) Patent No.: US 8,300,111 B2
(45) Date of Patent: Oct. 30, 2012

(54) HIGHLIGHT SUPPRESSION IMAGE PICKUP APPARATUS

(75) Inventor: Waro Iwane, Sapporo (JP)

(73) Assignee: Iwane Laboratories, Ltd., Sapporo-Shi (JP)

( * ) Notice: Subject to any disclaimer, the term of this patent is extended or adjusted under 35 U.S.C. 154(b) by 248 days.

(21) Appl. No.: 12/659,006

(22) Filed: Feb. 23, 2010

(65) Prior Publication Data

US 2010/0220221 A1  Sep. 2, 2010

Related U.S. Application Data

(62) Division of application No. 10/594,033, filed on Sep. 25, 2006, now abandoned.

(51) Int. Cl.
*H04N 9/73* (2006.01)
*H04N 5/228* (2006.01)

(52) U.S. Cl. ............... 348/221.1; 348/223.1; 348/224.1; 348/225.1

(58) Field of Classification Search ............... 348/223.1, 348/224.1, 225.1, 230.1, 262, 265, 336, 337
See application file for complete search history.

(56) References Cited

U.S. PATENT DOCUMENTS

| | | | |
|---|---|---|---|
| 6,874,687 B2 * | 4/2005 | Kubota | 235/462.11 |
| 7,106,377 B2 * | 9/2006 | Bean et al. | 348/364 |
| 2002/0012064 A1 * | 1/2002 | Yamaguchi | 348/362 |
| 2003/0020958 A1 * | 1/2003 | Bean et al. | 358/302 |
| 2011/0211077 A1 * | 9/2011 | Nayar et al. | 348/207.1 |

* cited by examiner

*Primary Examiner* — John Villecco
*Assistant Examiner* — Selam Gebriel
(74) *Attorney, Agent, or Firm* — Manabu Kanesaka

(57) ABSTRACT

A highlight suppression image pickup apparatus includes a camera part provided with a lens optical system, an active filter part which is disposed in the vicinity of a focal plane of the camera part and which can control the amount of transmitted light, a light sensing device which senses a light transmission amount of the active filter part, and highlight suppression signal producing parts which produce a highlight suppression signal which controls the light transmission amount of the active filter part such that the amount of light sensed by the light sensing device becomes a predetermined reference value. The highlight suppression signal which controls the light transmission amount of the active filter part is output an image signal.

19 Claims, 24 Drawing Sheets

Fig. 4
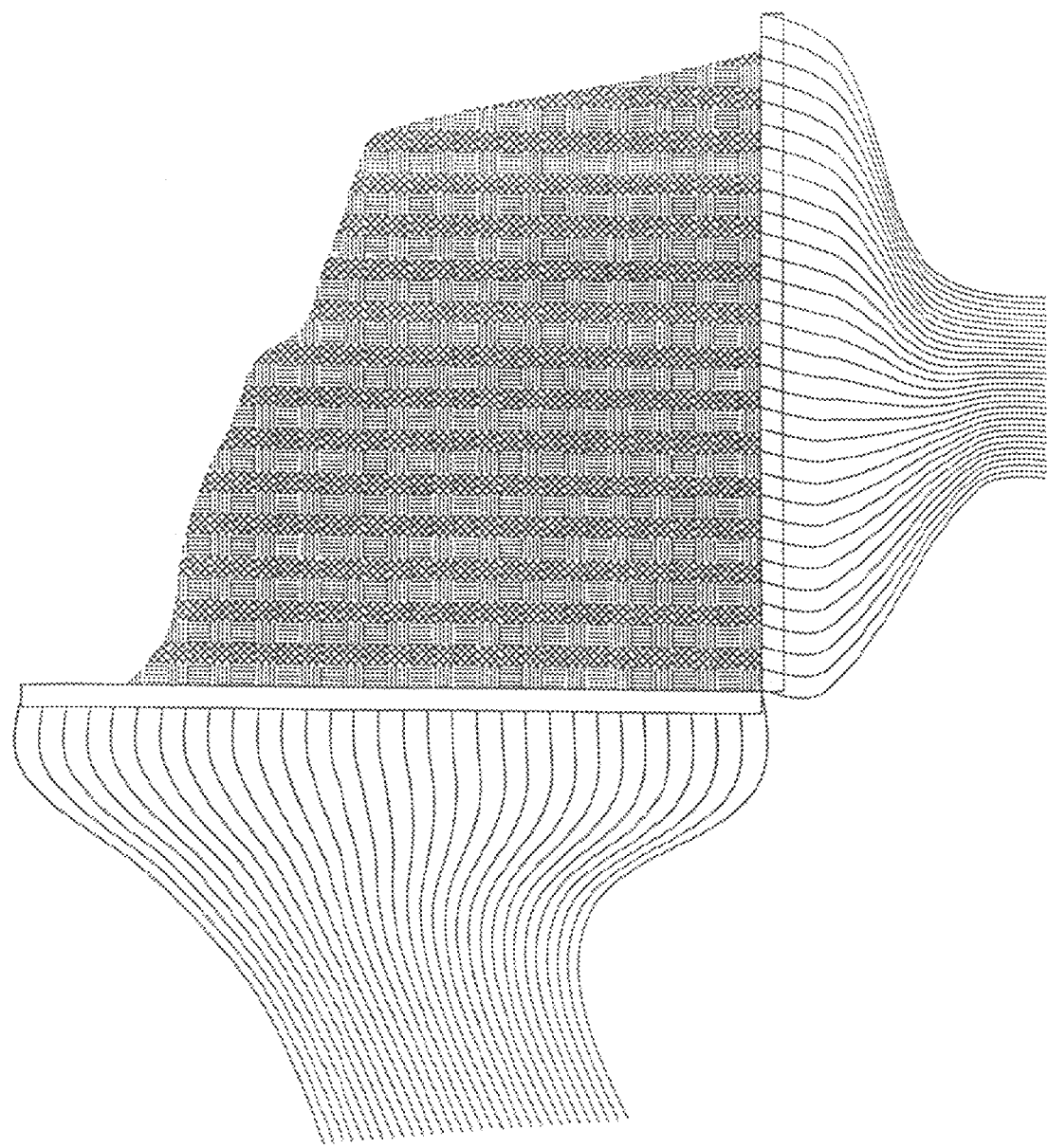

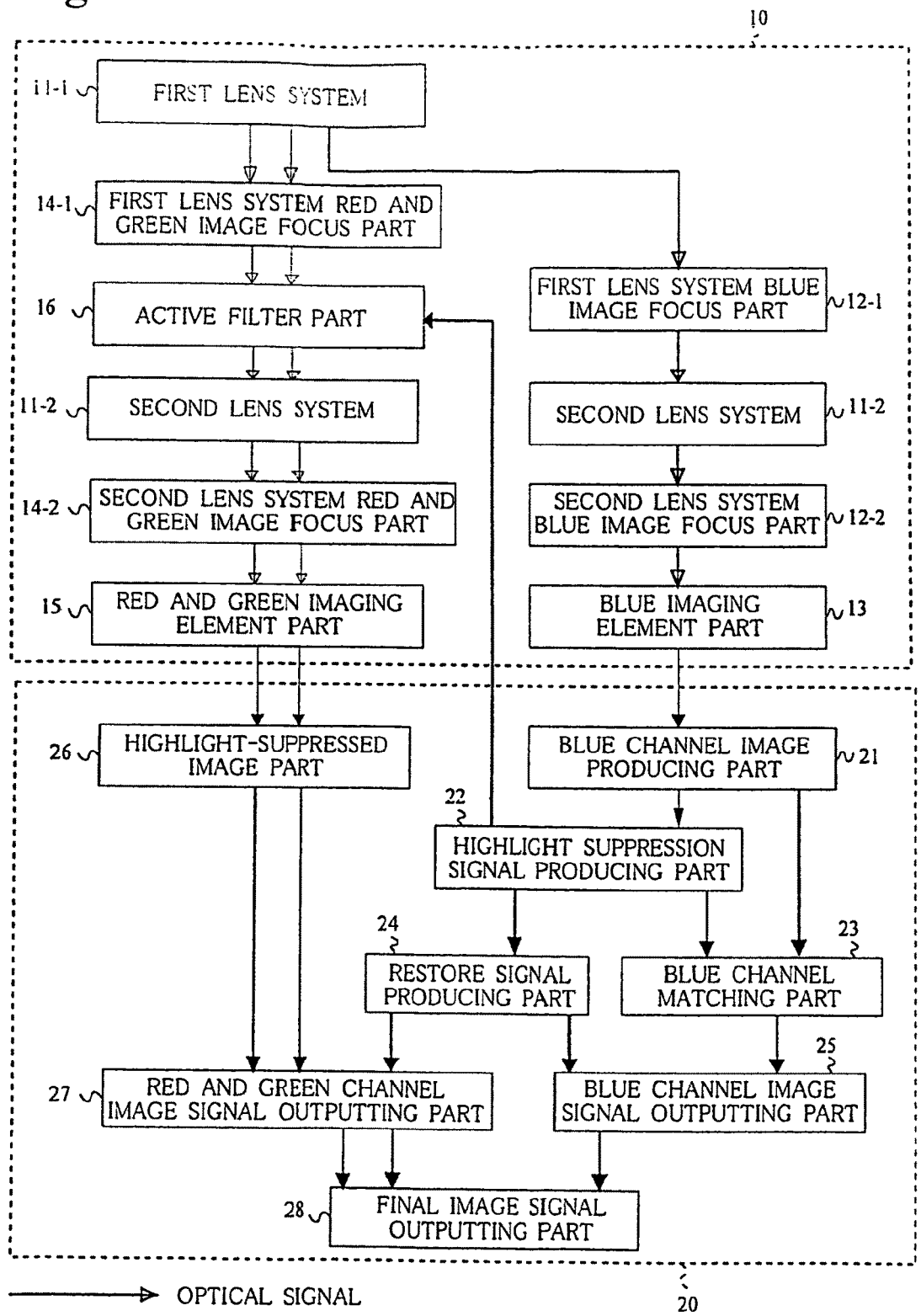

IMAGE INPUT SIGNAL

GRADATION-TYPE HIGHLIGHT SUPPRESSION SIGNAL

GRADATION-TYPE HIGHLIGHT SUPPRESSION SIGNAL

GRADATION-TYPE RESTORED IMAGE SIGNAL

IMAGE INPUT SIGNAL

BINARY HIGHLIGHT SUPPRESSION SIGNAL

BINARY HIGHLIGHT-SUPPRESSED IMAGE SIGNAL

SUPPRESSION CHARACTERISTICS
ARE SET TO BE DIFFERENT AMONG
RGB CHANNELS, SUCH THAT
HIGHLIGHT SUPPRESSION IS
PERFORMED IN AREA WHERE
CHARACTERISTICS OF EACH
CHANNEL ARE MOST EFFICIENT,
AND RESTORATION IS ACHIEVED,
AND FINALLY, IMAGES ARE SYNTHESIZED
TO OUTPUT IMAGE

INPUT SIGNAL HISTOGRAM

HISTOGRAM OF HIGHLIGHT SUPPRESSION SIGNAL
* SAME SHAPE AS THAT OF IMAGE SIGNAL

HISTOGRAM AFTER SUPPRESSION

HISTOGRAM AFTER SUPPRESSION

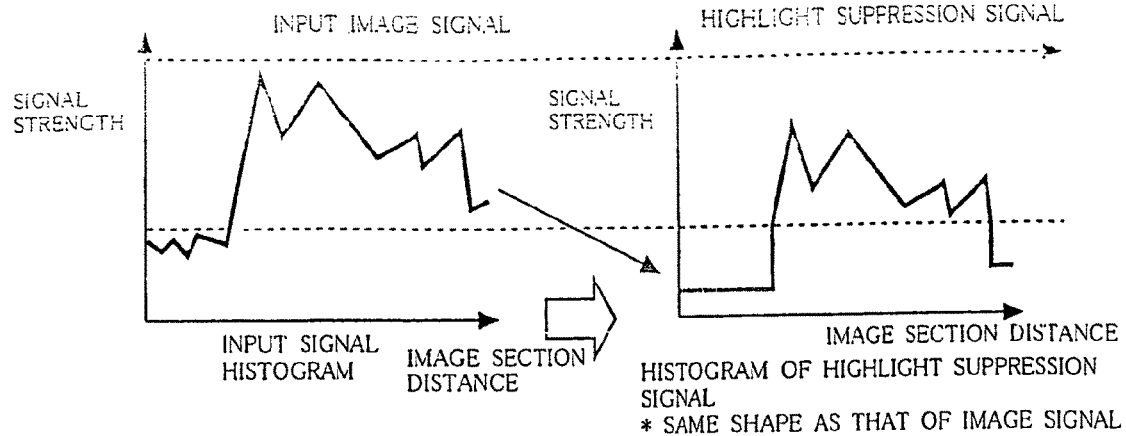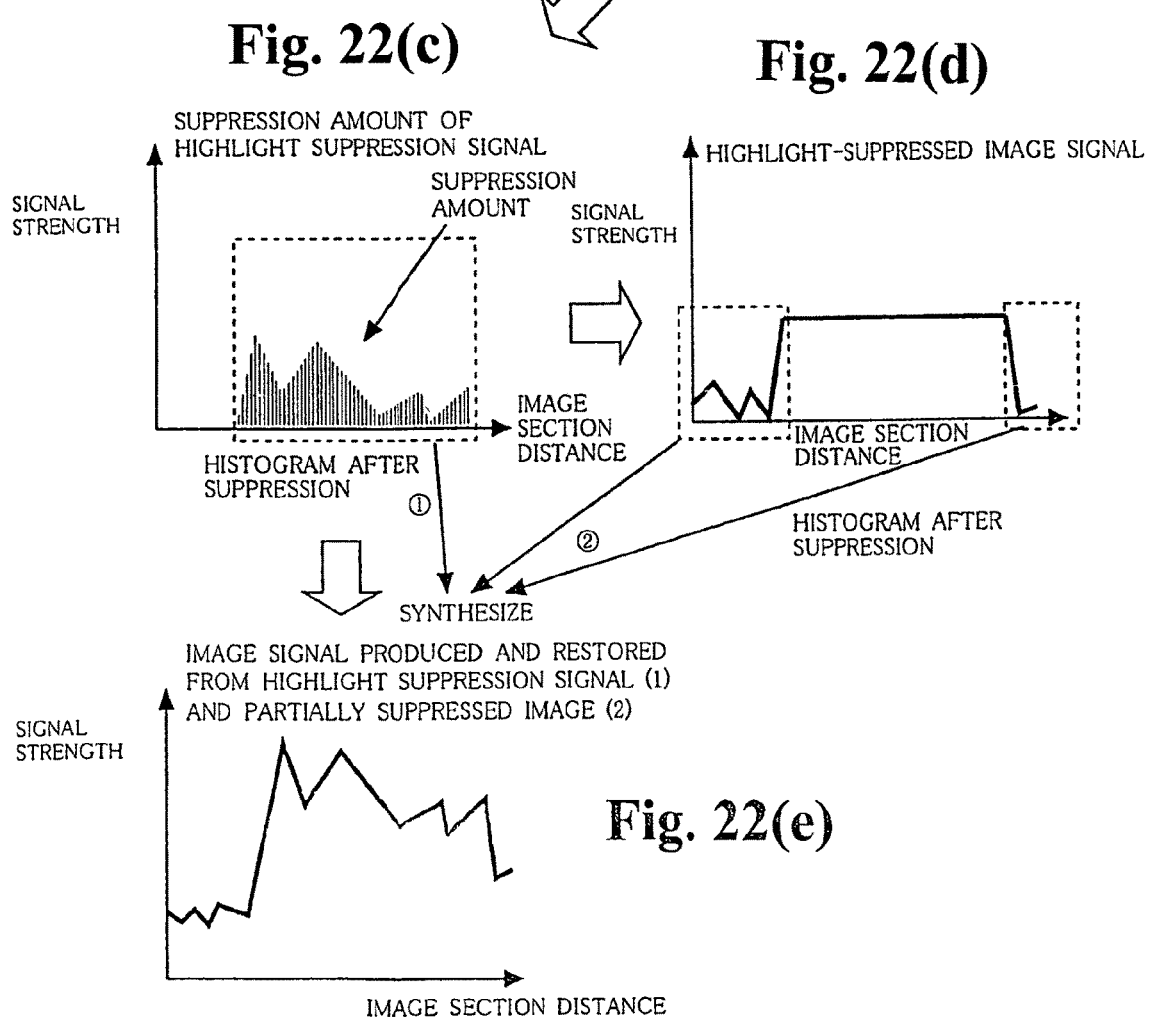

HIGHLIGHT SUPPRESSION IMAGE PICKUP APPARATUS

CROSS-REFERENCE TO RELATED APPLICATION

This is a divisional application of Ser. No. 10/594,033 filed on Sep. 25, 2006 now abandoned.

TECHNICAL FIELD

The present invention relates to an image pickup apparatus such as a 3-CCD camera or a single plate type CCD camera for picking up an image of a desired subject. More particularly, it relates to an image pickup apparatus for obtaining a totally high-quality image of a subject such as sunlight and dark parts therearound in outer space or parts around a road and bright parts with headlights at night.

Still more particularly, the present invention relates to a highlight suppression image pickup apparatus, wherein in the case of an image adversely affected by highlight all over, such as an image of the headlights of automobiles or the like at night or in a dark place, an image with great latitude in outer space, or an image with high contrast, highlight components are optically and electronically removed or suppressed before light reaches an imaging element, such that a particularly bright portion in the image is removed or suitably suppressed in a subsequently restorable manner without sacrificing a dark portion, thereby making it possible to acquire a high-quality image in which the dark portion is not affected by the highlight.

BACKGROUND ART

In general, in picking up a video image or a still image with a camera such as a 3-charge-coupled-device (3-CCD: three-plate type) camera or a single plate type CCD camera, there has been a problem of a significant decrease in image quality due to a halation and the like when picking up an image with great latitude (a range of difference between bright and dark portions) or a special image having an intense highlight portion.

For example, in the pickup of an image of a contrasty subject, as in video image pickup in outer space, if the sun is placed in a field of view and exposure is adjusted to the sun, the sun is only visible, whereas if the exposure is adjusted so that its surrounding portions are also visible, a halation is caused due to sunlight in the portions other than the sun, resulting in deterioration in the image quality. Moreover, when an image of a road or the like is picked up with a video camera at night, the headlights of automobiles alone are strongly visible, which optically and electronically affects other portions and leads to deterioration in the entire image quality.

Here, in cameras such as conventional cameras, video cameras and digital cameras, measures have been taken; gamma characteristics are transformed into a nonlinear form and saturated so as to electronically cut peak portions, thereby suppressing highlight (e.g., refer to Japanese Patent Publication Laid-open No. 5-244623 (pages 2 to 3, FIG. 7), Japanese Patent Publication Laid-open No. 6-23331.0 (page 2, FIG. 3) and Japanese Patent Publication Laid-open No. 8-149378 (page 2, FIG. 5)).

Such electronic processing can hold down the highlight to some degree, and it has been possible to acquire an image in which the highlight is held down in appearance.

However, according to such a conventional method, the electronic processing is performed after image light reaches an imaging plane, so that the imaging plane has already suffered optical adverse effects that deteriorate image quality, such as a halation caused by light scattering or a fog, and it has been impossible to remove these effects. Thus, the electronic processing in the conventional method alone has not led to a fundamental solution of the highlight image problem.

Furthermore, in general cameras, the sensitivity of the entire image is decided by the brightness of the highlight portion, so that the signal-to-noise ratio (S/N: a value serving as an index to evaluate image quality) in the dark portion significantly decreases, and there has been a problem of unavoidable excessive deterioration of the image quality in the dark portion.

Moreover, especially when an image of, for example, a road is picked up at night, the problem of a halation due to light scattering is caused especially around headlights even if a bright portion with headlights is saturated to adjust the exposure to a dark side, resulting in a decrease in the image quality.

There has been another problem wherein output is saturated in the portion corresponding to the headlights of automobiles or the like owing to the characteristics of imaging elements, and subsequent processing of an image signal once saturated only makes a slight improvement, such that an extreme decrease is inevitable in the amount of image information in the bright portion.

As described above, the methods heretofore proposed are capable of alleviating to some degree the adverse effects of optical scattering or the like caused by the headlights of the automobiles through electronic processing, but are incapable of essentially removing these adverse effects.

The present invention has been proposed to solve such problems in the conventional techniques, and is directed to provide to a highlight suppression image pickup apparatus wherein in an image with great latitude or an image having an intense highlight portion, the highlight components can be optically and electronically removed and suppressed before light reaches an imaging element, and the effects of the highlight are fundamentally and essentially suppressed and removed so that a high-quality image can be acquired while preserving as much information for the highlight portion as possible.

DISCLOSURE OF THE INVENTION

In order to achieve the foregoing object, a highlight suppression image pickup apparatus of the present invention according to claim 1 comprises: a camera part which acquires a desired image; a highlight suppression signal producing part which produces a highlight suppression signal on the basis of an image output from one color channel or at least one of two or more color channels output from the camera part (or on the basis of an image output of a dedicated channel as defined in claim 5); and an active filter part which is disposed in the vicinity of a focal plane of the camera part and which optically controls, in accordance with the highlight suppression signal, the amount of light transmitted to an imaging plane of each of the color channels, wherein the image acquired in the camera part is output, via the active filter part, as a highlight-suppressed image in which highlight is suppressed.

Particularly preferably, as defined in claim 2, the active filter part optically controls the amount of light transmitted to each portion of the imaging plane of each color channel in predetermined pixel units or predetermined image area units in accordance with the highlight suppression signal.

According to the highlight suppression image pickup apparatus of the present invention having such a configuration, when, for example, there is provided a color camera (e.g., a 3-CCD camera or a single plate type CCD camera) capable of acquiring a desired image in channels of three colors including red, green and blue, an output of the blue channel, for example, is used among three kinds of image outputs to generate a histogram, so that a highlight portion can be extracted from the acquired image to produce a highlight suppression signal. In addition, the highlight suppression signal is produced from the blue channel because the blue channel is generally least affected by highlight, and it goes without saying that the other color channels may be used or the highlight suppression signal may be produced from a brightness signal which is a synthesis of RGB as defined in claim 9.

Furthermore, this highlight suppression signal can be used as a highlight suppression signal for producing images of the red and green channels in order to control the active filter part disposed in the vicinity of the focal plane of an optical system. The active filter can be configured by, for example, a liquid crystal panel, and this is used as an optical filter capable of controlling the amount of transmitted light per pixel (and as an optical shutter as defined in claim 13), such that an area of a suppressed portion is produced on a liquid crystal filter by the highlight suppression signal, and, for example, portions corresponding to the highlight portions of the red and green channel images can be optically suppressed to produce an image with suppressed highlight.

Thus, the highlight portions of the image are optically suppressed by the active filter part before light reaches the imaging plane, thereby making it possible to acquire a high-quality highlight-suppressed image without image portions affected by the highlight.

It is appreciated that the optical suppression by the active filter part is not limited to the highlight portion alone. For example, as defined in claims 6 to 8, the optical suppression by the active filter part is performed in a gradational manner over the entire image intensely on a highlight side and weakly on a lowlight side, such that a target with great latitude is accepted and the lowlight side can be relatively raised. As a result, noise on the lowlight side can also be suppressed. Further, this can prevent the highlight portion from being saturated, and the amount of information on the image can therefore be preserved to a considerable extent.

Furthermore, in the highlight suppression image pickup apparatus according to claim 3, the active filter part is provided in the vicinity of the imaging plane of the camera part.

Thus, in the highlight suppression image pickup apparatus of the present invention, the active filter made of liquid crystal or the like can be disposed immediately before the imaging plane of the camera part and used.

In general, the imaging plane is the focal plane in a camera such as a 3-CCD or a single plate type CCD. Therefore, the active filter can be located immediately before the imaging plane so that it functions as a pixel-by-pixel automatic optical filter, thereby making it possible to obtain the above-mentioned beneficial effects according to the present invention.

It is to be noted that a plurality of active filters can be provided to correspond to the respective color channels when a color image is to be obtained. Moreover, the position for disposing the active filter can not correspond to the imaging plane for structural reasons in some cameras, but this is preferable because a forward deviation of the position from the imaging plane over a slight distance functions to cause blurring around a portion subjected to filtering effects and thus blurs the shade of the filter structure.

On the other hand, in the highlight suppression image pickup apparatus according to claim 4, the camera part comprises a focal plane within a lens optical system which is different from the focal plane of the imaging plane, and the active filter part is provided in the vicinity of the focal plane within the lens optical system.

Thus, in the highlight suppression image pickup apparatus of the present invention, the active filter can be provided in a lens portion of the camera.

In general, a focal plane can be produced in a place other than the imaging plane of the camera, and this can be achieved, for example, by once forming an image in a space within the lens system of the camera and again forming an image on the imaging plane. In this case, one active filter may only be provided for one focal plane in the lens. Thus, the lens in which the active filter is disposed is installed in the imaging space of the lens system, thereby making it possible to realize the highlight suppression image pickup apparatus of the present invention only by the exchange of lenses without changing the structure of the main unit of the camera.

Furthermore, in the highlight suppression image pickup apparatus according to claim 5, the camera part comprises: an image acquiring channel part which acquires a desired image; and a dedicated channel part which acquires an image used to produce a highlight suppression signal and which is different from the image acquiring channel part, wherein the highlight suppression signal producing part produces, on the basis of an image output acquired in the dedicated channel part, a highlight suppression signal corresponding to the image obtained in the image acquiring channel part.

Thus, in the highlight suppression image pickup apparatus of the present invention, it is possible to separately provide the image acquiring channel part (e.g., a main camera part) for acquiring a desired image and the: dedicated channel part (a dedicated camera part) for the highlight suppression signal. For example, there are disposed a color camera part for image acquisition and a dedicated independent channel part for producing a highlight suppression signal, and output images are associated with each other between the main camera image output and the dedicated channel image output. Then, for example, a histogram of the output of the dedicated channel is generated to extract the highlight portion from the image of the dedicated channel, and a highlight suppression signal can be produced from the extracted signal.

Thus, the channel for image acquisition and the channel for the highlight suppression signal are separately provided, such that a particular channel among the RGB (red, green and blue) three-color channels for image acquisition is no longer needed to be used to produce a suppression signal, and optical highlight suppression effects can be exerted on all the channels of RGB. It is thus possible to obtain a more complete highlight-suppressed image.

Furthermore, the highlight suppression image pickup apparatus according to claim 6 comprises an electronic control part which electronically suppresses the image output from the camera part on the basis of the highlight suppression signal, wherein the image output acquired in the camera part is optically highlight-suppressed via the active filter, and output as a highlight-suppressed image in which the highlight is electronically suppressed.

Thus, in the present invention, it is possible perform, on the basis of the highlight suppression signal produced from the image output of the camera part, not only the optical highlight suppression via the active filter but also the electronic highlight suppression.

For example, when a highlight suppression signal is produced from the image of the blue channel, this highlight suppression signal is used to first optically suppress the highlight in the blue image to the vicinity of the saturation point of the signal. Then, this highlight suppression signal can be used to electronically control the blue image itself to electronically acquire a blue highlight-suppressed image. Further, the electronically controlled blue highlight-suppressed image is synthesized with the other color channel images optically controlled by the active filter, such that a color image in which colors are normally reproduced can be output from an image output part. The electronic control alone leaves a certain degree of image quality deterioration, but an active filter is disposed in the blue channel itself from which the suppression signal is produced in order to combine the optical suppression and the electronic suppression, and blue is then synthesized with the other colors optically controlled via the active filter, such that an image in which the three colors are synthesized are sufficiently practical as a whole.

Thus, the highlight portion is suppressed by the combination of the optical control and the electronic control, such that the highlight suppression can be carried out in the channel for producing a highlight suppression signal (e.g., the blue channel) in the same manner as the other channels, and it is possible to output a highlight-suppressed image with higher quality.

Furthermore, in the highlight suppression image pickup apparatus according to claim 7, the highlight suppression signal producing part produces a non-binary highlight suppression signal which indicates gradation, and the image output acquired in the camera part is output as a highlight-suppressed image in which the highlight suppression is gradationally given by the non-binary highlight suppression signal via the active filter part intensely on a highlight side and weakly on a lowlight side.

Particularly preferably, as defined in claim 8, the apparatus comprises a restore signal producing part which produces a restore signal on the basis of the non-binary highlight suppression signal which indicates the gradation, wherein the highlight-suppressed image in which the highlight suppression is gradationally given via the active filter part is restored to the gradation of the original image and then output.

In such a configuration, in the highlight suppression image pickup apparatus of the present invention, the highlight suppression signal for highlight-suppressing the acquired image is produced not as a mere binary signal (high or low) but as a non-binary signal which indicate the gradation of the image acquired in the camera part and which is strong on the highlight side and weak on the lowlight side, thereby making it possible to acquire a highlight-suppressed image.

For example, the highlight suppression signal producing part produces a highlight suppression signal which has characteristics to optically intensify the suppression in proportion to the intensity (highlight level) of image light, and this highlight suppression signal is input to the active filter part, such that it is possible to produce an intermediate image having gradation with weak contrast of the highlight suppression in which the lowlight side is emphasized and the highlight side is suppressed. Then, the restore signal producing part produces a restore signal directly from the highlight suppression signal having gradation characteristics, and this restore signal is used to restore the intermediate image to the gradation of the original image, such that it is possible to obtain an output image having the gradation of the original image acquired in the camera part.

On the other hand, in an image (e.g., a blue channel image) which serves as a basis for the highlight suppression signal, not only the optical suppression but also the electronic control can be incorporated as described above for the suppression of the highlight to generate the intermediate image, such that the highlight suppression can be matched to the restored gradation images of the other channels.

Thus, for example, the optical suppression is used for the red channel and the green channel, while the electronic suppression alone is used (or the electronic suppression is mainly used and the optical suppression is secondarily used) for the blue channel. Then, the highlight-suppressed images of the respective channels can be synthesized to obtain a final highlight-suppressed image. It is to be noted that the optical suppression may not only be performed with the common highlight suppression signal but also be performed independently for each channel as defined in claim 15. If the images of these channels are matched and synthesized, a correct image signal is output.

In the image in which the highlight suppression signal comprising the non-binary signal is used to optically suppress the highlight and the gradation is restored, the influence of optical scattering can be prevented and an imaging element (CCD) can be used under a condition with less noise, as compared with the image in which the highlight is suppressed simply in an electronic manner. It is thus possible to obtain higher image quality with greater latitude and a wider dynamic range. Moreover, the highlight suppression signal comprising the non-binary signal is used as it is for a restore signal to restore the original gradation. Thus, nonlinear distortion is not easily caused in the restored signal even if the linearity of the highlight suppression signal is not good or even if the highlight suppression signal is nonlinear.

Thus, in the present invention, the non-binary signal indicating the gradation of the image is used as the highlight suppression signal to optically acquire suppression signal. Further, the restore signal obtained from a binary signal is used to electronically restore the original latitude in the suppressed image, thereby making it possible to obtain an image which has high quality with less influence of noise or the like and which finally has normal gradation without the highlight suppression, or an image in which the level of highlight suppression is adjusted.

Furthermore, as defined in claim 9, in the highlight suppression image pickup apparatus of the present invention, the camera part comprises: an infrared imaging element having sensitivity to infrared rays on a long-wavelength side; an optical filter which cuts visible light sensitivity of the infrared imaging element; and a visible light imaging element having sensitivity to visible light, wherein the highlight suppression signal producing part produces a highlight suppression signal on the basis of the image output of visible light output from the camera part, and the image output acquired in the camera part is output as a highlight-suppressed infrared image via the active filter part whose infrared image transmission characteristics are controlled by the highlight suppression signal based on a visible light image.

In such a configuration, the highlight suppression image pickup apparatus of the present invention can be used as an infrared camera.

In general, highlight suppression of the image having an intense highlight portion is required particularly in the pickup of an image of a road at night. Moreover, an infrared image pickup is often performed in the image pickup at night or in a dark place. It is therefore necessary achieve the highlight suppression of infrared rays. Here, there is not usually a great difference of the highlight portion between a near-infrared image and the visible light image. Further, it has been recognized that a CCD imaging element has a certain level of sensitivity to the infrared rays. Therefore, the present invention takes advantage of such sensitivity characteristics of the CCD imaging element to realize an image pickup apparatus capable of the highlight suppression of the infrared image.

For example, in the red channel having a certain level of sensitivity to the infrared rays, visible light portions are cut by another optical filter to use the apparatus as infrared camera. On the other hand, a highlight suppression signal is produced from the blue or green channel image. Then, this highlight suppression signal is sent to the active filter, such that a highlight-suppressed infrared image can be acquired.

Thus, the present invention can realize an image pickup apparatus compatible with the infrared rays which is suitable for the highlight suppression of the night image whose quality is dropped by the headlights of the automobiles or the like.

Furthermore, as defined in claim 10, in the highlight suppression image pickup apparatus of the present invention, the active filter part is provided as a composite element integrated with the imaging element of the camera part.

Thus, in the present invention, the active filter element can be integrated with the CCD imaging element to form a composite imaging element. This eliminates, for example, the problem of the alignment of each imaging element with the active filter in a manufacturing process of the present image pickup apparatus, and enables an image pickup apparatus with increased performance to be manufactured at low cost.

Furthermore, as defined in claim 11, the active filter part can have a multilayer structure in which elements for control of the amount of transmitted light are arranged on a plurality of stages.

Thus, the active filter part according to the present invention can have a plurality of stages of element planes such as liquid crystal planes for controlling the amount of transmitted light in pixel units or image area units. In this manner, the light which penetrates the active filter part passes the multilayered liquid crystal elements one after another, and each of the liquid crystal planes can be electronically controlled to drastically control the amount of transmitted light in a broader range.

The active filters according to the present invention are light transmitting filters and can be, in principle, used in a stacked manner. If a plurality of steps of optional active filters is used in a multilayered manner, it is possible to resist a strong intensity of light such as sunlight in outer space and to maintain the sensitivity of a bare CCD to weak light. Thus, the active filter permits the dynamic range of light transmission to be selected as desired. In particular, drastic control of the amount of transmitted light is required to realize the invention according to claims 16 and 17, to which the multilayered structure of the active filters is especially effective.

Here, all of the multilayered element planes may be controlled by the same highlight suppression signal, but independent highlight suppression signals are effectively used for the respective element planes when the element planes are used which have nonlinear transmission characteristics with respect to the amount of transmitted light or when the element planes different in material and characteristics are multilayered from the beginning. In this case, there is a plurality of highlight suppression signals. However, since the light transmission characteristics of the element planes are known in advance, the relation between the strength of the highlight suppression signals of the respective element planes and the amount of highlight suppression of light is already known. Moreover, from their characteristics, it is possible to obtain the amount of highlight suppression of light in the entire multilayered filter in which the element planes are stacked. Therefore, as in claims 16 and 17, even when an image signal is produced from the amount of highlight suppression, the characteristics of the individual layers can be synthesized to produce an image producing signal.

Furthermore, as defined in claim 12, the active filter part can comprise an element which controls the amount of transmitted light in accordance with the intensity of incident light instead of the electronic control.

Thus, in the present invention, as the element for controlling the amount of transmitted light in the active filter, it is possible to use an element capable of directly responding to the intensity of light and changing the transmittance on its own in accordance with the amount of irradiated light without the electronic control instead of using an electronically controllable element such as crystal liquid. This element also enables the function of the active filter according to the present invention in the same manner as the electronically controllable element. In addition, such an element may be independently used, but is more effective if it is used with the electronically controllable active filter in a stacked state.

Furthermore, as defined in claim 13, the active filter part can control the transmission time of transmitted light to control the amount of light transmitted to the imaging plane of each color channel.

In such a configuration, the active filter part can not only optically control the amount of transmitted light on the basis of the highlight suppression signal but also can electronically control the transmission time to control the amount of transmitted light. That is, the active filter part can function as an optical shutter.

When such a shutter function is achieved by the active filter, elements having good light on-off characteristics are used as elements to construct the active filter, and these elements are arranged in a planar manner on a pixel to pixel basis, thereby enabling an effective shutter function.

Furthermore, as defined in claim 14, the imaging element provided on the imaging plane of each color channel can control charge storage time in predetermined pixel units or predetermined image area units to control the sensitivity of the imaging plane.

Thus, the charge storage time can be controlled in each imaging element comprising a CCD and a light sensing element, so that the exposure, time in the highlight portion is reduced to increase time resolution and decrease the sensitivity at the same time, while the exposure time in the lowlight portion is increased to store charges and enhance the sensitivity substantially at low illuminance.

In general, in a normal imaging element, the charge storage time is always fixed in each pixel and not changed on a pixel to pixel basis. When the charge storage time in the imaging element can be controlled per pixel, the sensitivity of high-illuminance portions in the image can be decreased and the dynamic range can be widened. That is, the effective amount of incident light is controlled per pixel, and the sensitivity of the high-illuminance portions is decreased, such that an image with great latitude can be acquired with a sufficient dynamic range.

This, in combination with the highlight suppression signal, enables the imaging part to independently acquire a highlight-suppressed image. This means that the imaging part has part of the function of the active filter part, and the imaging part can therefore be used as the active filter part according to the present invention.

Here, in the imaging element, the charge storage time can be controlled per pixel to also control the sampling frequency of each pixel in accordance with the amount of incident light, and charges can be stored per pixel for a time shorter or longer than the normal frame time of an image. Thus, on a high-illuminance side, the highlight side is suppressed, the sampling frequency increases, and the time resolution is improved. On the other hand, on a low-illuminance side, the charge storage time increases, and the sensitivity can be increased as much as the time resolution has been sacrificed.

Furthermore, since the charge storage time varies pixel by pixel, an image can be transmitted at a different sampling frequency for each pixel. In this manner, the increase of the sampling frequency increases the time resolution of the image on the high-illuminance side, which is effective. In addition, in order to display the image on a normal image device or the like, it is desirable that an image per pixel be once stored in a frame memory or the like and converted to a given frame frequency to create a final image.

Furthermore, as defined in claim 15, the highlight suppression signal producing parts can be provided in the respective color channels, highlight-suppressed images are produced in the respective color channels, and the produced highlight-suppressed images are synthesized to be output as a final highlight-suppressed image.

Thus, in the present invention, a highlight suppression signal can be independently produced in each color channel, and a highlight-suppressed image for each color channel can be produced. Then, the images in the respective channels are independently restored from the respective highlight-suppressed images, and these images can be synthesized to output a final image signal.

This is effective especially when the highlight portions widely vary in the respective channels.

Furthermore, as defined in claim 16, the output of the highlight-suppressed image produced on the basis of the highlight suppression signal can be suppressed to a predetermined reference value, and an image signal produced from a signal indicating the amount of this suppression is output as a highlight-suppressed image.

In particular, as defined in claim 17, for a highlight portion in the highlight-suppressed image produced on the basis of the highlight suppression signal, an image signal is produced from the signal indicating the amount of suppression performed to the predetermined reference value, and for a low-light portion therein, an image signal based on the highlight suppression signal is produced, and these image signals are then synthesized to be output as a final highlight-suppressed image.

In such a configuration, a highlight suppression signal is produced from one color channel or two or more color channels, and this suppression signal is used to implement suppression until the output in a relevant channel reaches a prescribed value, and then the amount of suppression can be taken out to produce a new image signal. More specifically, suppression is implemented until the histogram of the output of the highlight-suppressed image becomes substantially flat, and the amount of this suppression is used for a new image signal. Then, for example, this is carried out in each channel of RGB, such that new image signals of RGB can be extracted. What is suppressed at this point and has been called the image signal so far loses information on the image. Then, the intensity of input light is uniformed on the imaging plane (CCD plane), and the highlight suppression signal indicating the suppression amount will take charge of the image information.

Thus, in the present invention, a desired highlight-suppressed image can be produced not by the imaging element comprising the CCD but by the active filter part for controlling the amount of transmitted light.

BRIEF DESCRIPTION OF THE DRAWINGS

FIGS. 2(a) and 2(b) are explanatory diagrams schematically showing the highlight suppression image pickup apparatus shown in FIG. 1, wherein FIG. 2(a) is a diagram of the entire apparatus, and FIG. 2(b) is a detail diagram of a lens system and an active filter;

FIG. 4 is a plan view showing a CCD element plane provided in the optical system when the highlight suppression image pickup apparatus shown in FIG. 1 is a single plate type CCD camera;

FIGS. 5(a) and 5(b) are explanatory diagrams showing how the active filter of the highlight suppression image pickup apparatus according to the first embodiment of the present invention is controlled, wherein FIG. 5(a) is a schematic diagram of an active filter surface, and FIG. 5(b) shows a graph indicating the amount of transmitted light in the active filter;

FIG. 6 is a block diagram showing the schematic configuration of a modification of the highlight suppression image pickup apparatus according to the first embodiment of the present invention;

FIGS. 7(a) and 7(b) are explanatory diagrams schematically showing the highlight suppression image pickup apparatus shown in FIG. 6, wherein FIG. 7(a) is a diagram of the entire apparatus, and FIG. 7(b) is a detail diagram of a lens system and an active filter;

FIGS. 9(a) to 9(d) are graphs showing image signals and highlight suppression signals obtained in the highlight suppression image pickup apparatus according to the first embodiment of the present invention, wherein FIG. 9(a) shows an image input signal, FIG. 9(b) shows a gradation-type highlight suppression signal, FIG. 9(c) shows a gradation-type highlight-suppressed image signal, and FIG. 9(d) shows a gradation-type restored image signal;

FIGS. 10(a) to 10(c) are graphs showing alternative image signals and alternative highlight suppression signals obtained in the highlight suppression image pickup apparatus according to the first embodiment of the present invention, wherein FIG. 10(a) shows an image input signal, FIG. 10(b) shows a binary highlight suppression signal, and FIG. 10(c) shows a binary highlight-suppressed image signal;

FIGS. 11(a) and 11(b) are graphs showing alternative image signals obtained in the highlight suppression image pickup apparatus according to the first embodiment of the present invention, wherein FIG. 11(a) shows time of light transmission allowed by a shutter and the light transmittance of the filter, and FIG. 11(b) shows the comparison of image signals with and without a shutter function;

FIGS. 19(a) to 19(c) are graphs showing image signals and highlight suppression signals obtained in color channels in the highlight suppression image pickup apparatus according to the fourth embodiment of the present invention, wherein FIG. 19(a) shows the signal in the red channel, FIG. 19(b) shows the signal in the green channel, and FIG. 19(c) shows the signal in the blue channel;

FIGS. 21(a) to 21(e) are graphs showing image signals and highlight suppression signals obtained in the highlight suppression image pickup apparatus according to the fifth embodiment of the present invention, wherein FIG. 21(a) shows an input image signal, FIG. 21(b) shows a highlight suppression signal, FIG. 21(c) shows the suppression amount of the highlight suppression signal, FIG. 21(d) shows a histogram of the highlight-suppressed image signal after suppression, and FIG. 21(e) shows an image signal produced from the suppression amount of the highlight suppression signal;

FIGS. 22(a) to 22(e) are graphs showing image signals and highlight suppression signals obtained in the highlight suppression image pickup apparatus according to the fifth embodiment of the present invention, wherein FIG. 22(a) shows an input image signal, FIG. 22(b) shows a highlight suppression signal, FIG. 22(c) shows the suppression amount of the highlight suppression signal, FIG. 22(d) shows a histogram of the highlight-suppressed image signal after suppression, and FIG. 22(e) shows the highlight suppression signal an image signal produced from the suppression amount of the highlight suppression signal;

BEST MODE FOR CARRYING OUT THE INVENTION

Preferred embodiments of a highlight suppression image pickup apparatus according to the present invention will hereinafter be described with reference to the drawings.

[First Embodiment]

Initially, a first embodiment of a highlight suppression image pickup apparatus of the present invention will be described referring to FIGS. 1 to 10.

Figure 1:
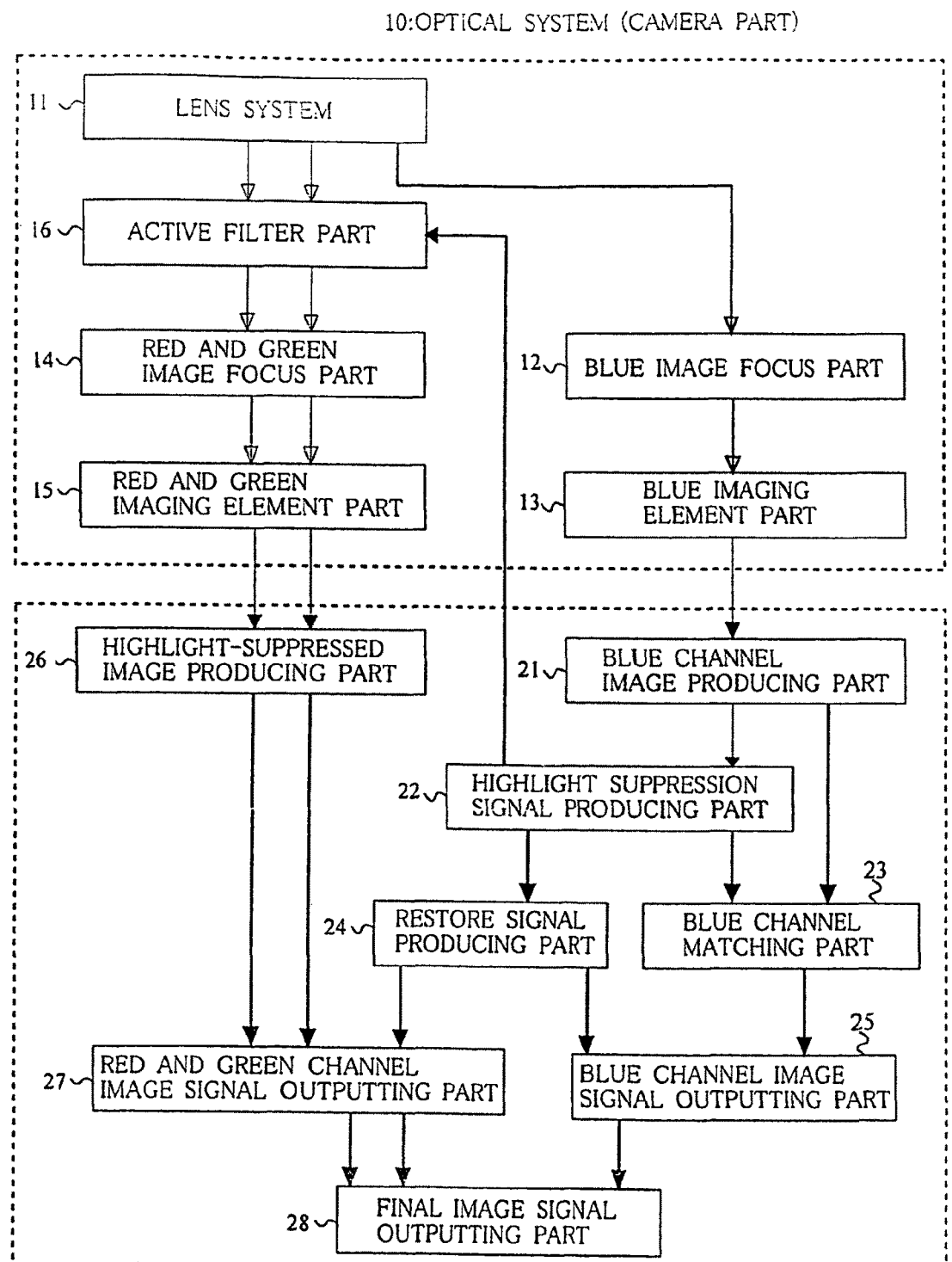
FIG. 1 is a block diagram showing the schematic configuration of a highlight suppression image pickup apparatus according to a first embodiment of the present invention.
Figure 2A:
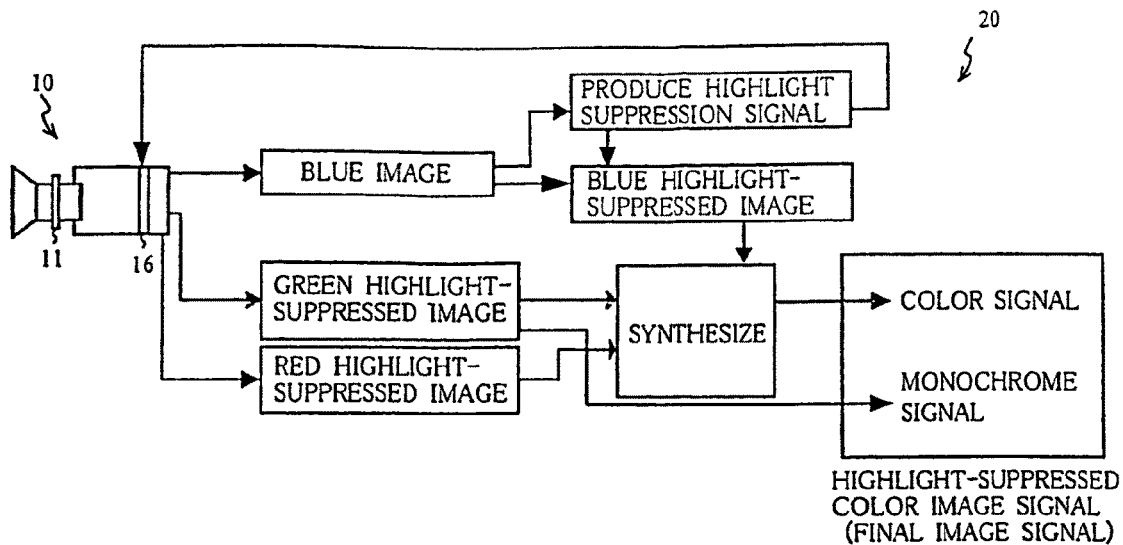
Figure 2B:
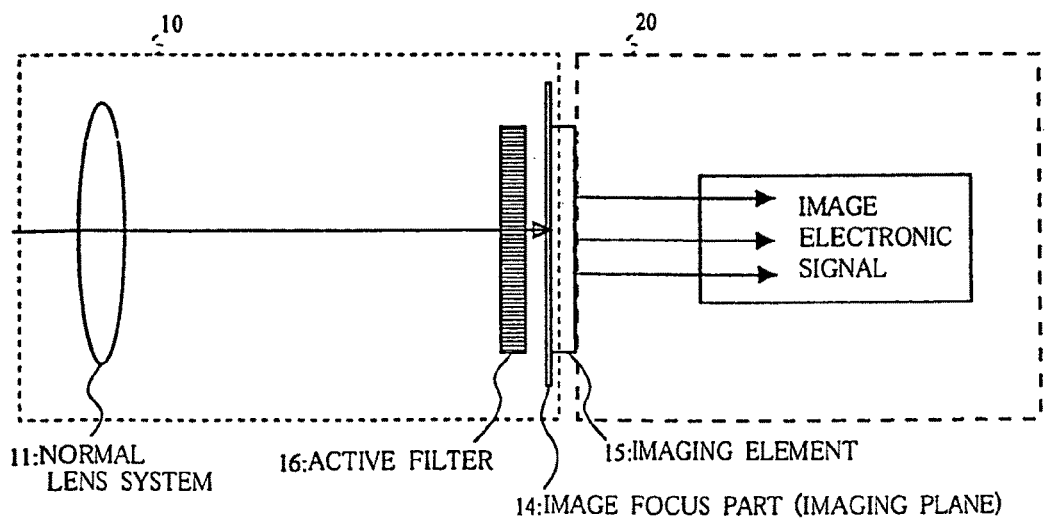

FIG. 1 is a block diagram showing the schematic configuration of a highlight suppression image pickup apparatus according to the first embodiment of the present invention. FIGS. 2 are explanatory diagrams schematically showing the highlight suppression image pickup apparatus shown in FIG. 1, wherein (a) is a diagram of the entire apparatus, and (b) is a detail diagram of a lens system and an active filter.

The highlight suppression image pickup apparatus shown in these drawings is capable of picking up a desired image and of suppressing and adjusting a highlight portion in the image. In the present embodiment, a 3-CCD color camera or a single plate type CCD camera is used to configure the apparatus. As schematically shown in FIG. 1, the present image pickup apparatus comprises an optical system (camera part) 10 and an electronic system (apparatus part) 20. Red and green images are optically suppressed, while a blue image is electronically suppressed. These images of the three colors are finally synthesized to output a color image with suppressed highlight.

The optical system (camera part) 10 is camera means for acquiring a desired image, and comprises: a lens system 11; and an image focus part and an imaging element which are provided so as to correspond to channels of three colors, that is, a blue image focus part 12 and a blue imaging element part 13, and a red and green image focus part 14 and a red and green imaging element part 15. It further comprises an active filter part 16 which is optical filter means.

Image signals of the channels for the respective colors of the image obtained in the optical system 10 are output to the electronic system (apparatus part) 20. The electronic system (apparatus part) 20 performs highlight suppression processing under electronic control, and then outputs a final image signal. More specifically, the electronic system (apparatus part) 20 comprises a blue channel image producing part 21, a highlight suppression signal producing part 22, a blue channel matching part 23, a restore signal producing part 24, a blue channel image signal outputting part 25, a highlight-suppressed image producing part 26, a red and green channel image signal outputting part 27 and a final image signal outputting part 28.

Furthermore, in the present embodiment, the highlight portion is extracted from the blue image acquired in the blue channel, and a highlight suppression signal is produced in the electronic system (apparatus part) 20, thereby controlling the active filter part 16 provided in the red and green channels.

In general, in the 3-CCD color camera or the single plate type CCD camera, an image coming into the camera usually passes through red, green and blue filters, thus obtaining images of the three primary colors. Moreover, an image of a night view is characterized in that blue components therein are much less than in the daytime, so that in a headlight image, it is presumed that the image of the blue channel is more difficult to saturate than the images of the channels of the other colors.

Therefore, in the present embodiment, the highlight portion is extracted from the blue channel image to produce a highlight suppression signal for suppressing the highlight portions in the images of the red and green channels.

It is to be noted that the color channel to serve as a basis for the highlight suppression signal is not limited to the blue channel, and the other channels are also definitely conceivable. For example, when a monochrome image is to be acquired, one channel in the color camera may be used for producing the highlight suppression signal, so that the filter is controlled by this signal to suppress the amount of light in the highlight portion and a monochrome signal is acquired from the other two channels. Moreover, the CCD is also sensitive to near-infrared rays, it is possible to obtain a highlight-suppressed infrared image for infrared rays (refer to a third embodiment described later). Further, a highlight suppression signal can be independently produced for each color channel (refer to a fourth and fifth embodiments described later).

Figure 3:
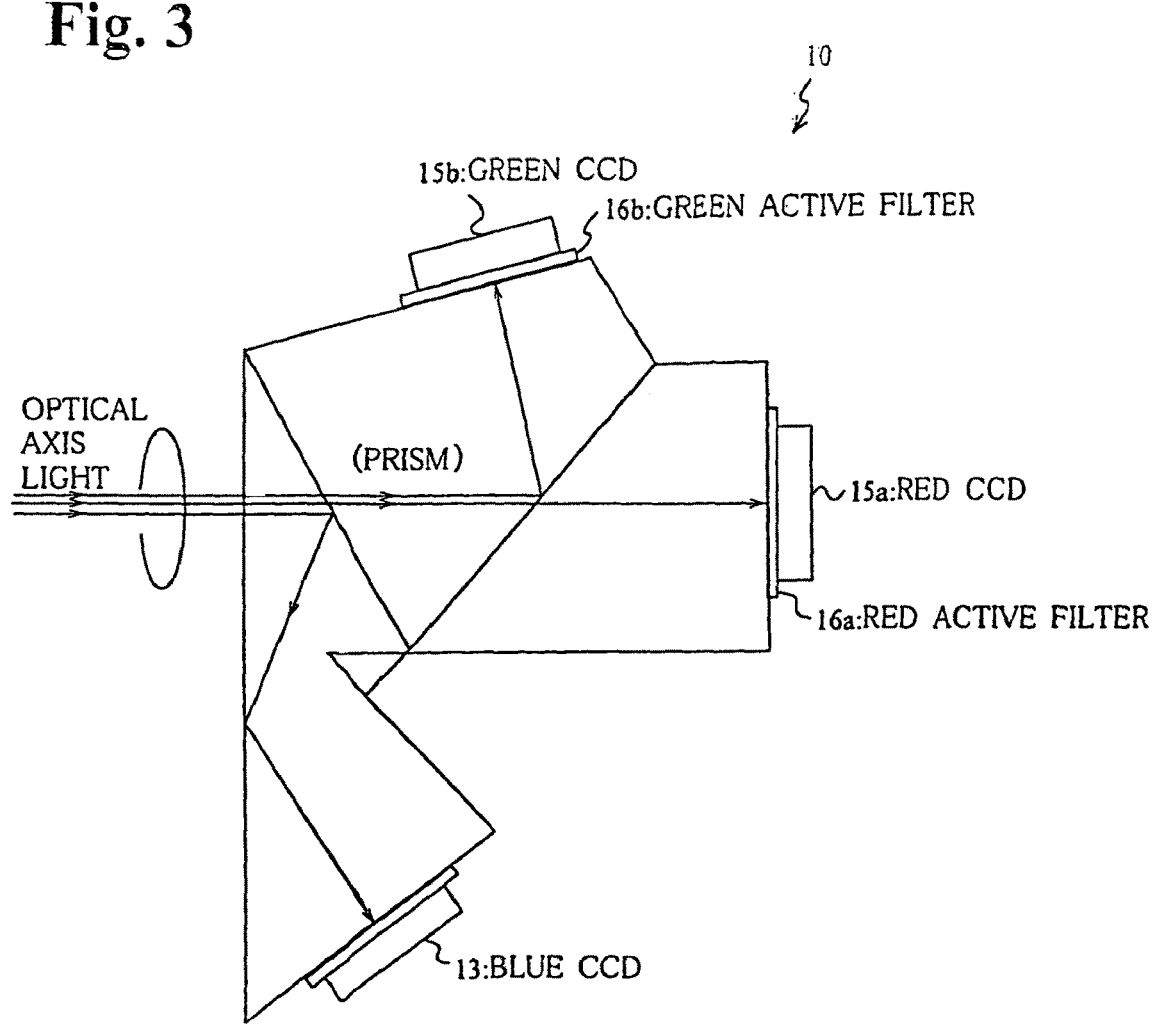
FIG. 3 is an explanatory diagram schematically showing the highlight suppression image pickup apparatus shown in FIG. 1, and is a detail diagram of a prism, CCDs and the active filters provided in an optical system of a 3-CCD camera.

More specifically, when the present image pickup apparatus is a 3-CCD color camera, the optical system (camera part) 10 according to the present embodiment takes a prism-type 3-CCD imaging method normally employed in color cameras, as shown in FIG. 3. As shown therein, optical axis light of an image is dispersed in three direction's by a prism, and finally reaches CCD elements (imaging elements) of the respective channels. That is, a blue image is produced in the blue CCD 13, a red image is produced in a red CCD 15a, and a green image is produced in a green CCD 15b.

Furthermore, there is provided the active filter part 16 (16a, 16b) for optical suppression immediately before the imaging element 15 (15a, 15b) of the red and green channels, thereby optically adjusting the amount of light transmitted to the corresponding imaging element under the control of the highlight suppression signal. It is to be noted that the active filter is omitted in the blue channel because the blue channel is used to produce the highlight suppression signal (see FIGS. 1 and 3), but it is naturally possible to provide an active filter part in the blue channel.

Furthermore, the present image pickup apparatus can also be configured by a single plate type CCD camera.

As shown in FIG. 4, in the method of the single plate type CCD camera, color filters of "RGB" (or "CMY") are placed for the respective pixel-by-pixel CCD elements arranged in matrix form, thereby extracting each color. Such a single plate type CCD is disadvantageous in terms of resolution as compared with the 3-CCD because information on luminance and colors is taken out of one CCD element, but the single plate type CCD permits cost reduction, size reduction, weight reduction, etc., and is thus used in digital still cameras and the like.

In such a single plate type CCD camera, optical suppression can also be carried out by the active filter part 16.

In this case, as shown in FIG. 4, in the CCD element, there are arranged, as a CCD plane, four kinds of filters of RGBN in which an N filter as an element for acquiring a highlight suppression signal is added to the RGB filters. Moreover, the active filters 16 corresponding to the RGBN are integrally disposed on a pixel to pixel basis, for example, immediately before the CCD element and between the CCD element and the color filter so as to correspond to the pixel-by-pixel filters of the respective colors of the RGBN on the CCD plane. Then, for the pixel-by-pixel CCD elements, the amount of transmitted light in each of the desired channels can be optically controlled under the highlight suppression signal produced from the N channel.

In addition, without providing the dedicated channel comprising the N filter, suppressed images can be independently produced from three kinds of channels comprising the RGB filters or can be produced from a brightness channel constituted of all the channels.

As described above, the single plate CCD method is different from the 3-CCD method as to whether the RGB are taken out on a pixel to pixel basis or the RGB images are structurally separated and then decomposed into pixels to take out the RGB. Any one of the methods permits the optical highlight suppression by the active filter according to the present invention.

Furthermore, the imaging element of each color channel can control charge storage time in predetermined pixel units or predetermined image area units to control the amount of light transmitted to an imaging plane. The charge storage time can be controlled in each imaging element comprising a CCD element and a light sensing element, so that the exposure time in the highlight portion is reduced to increase time resolution and decrease sensitivity at the same time, while the exposure time in a lowlight portion is increased to store charges and enhance the sensitivity substantially at low illuminance.

Thus, when the charge storage time in the imaging element can be controlled on a pixel to pixel basis, the sensitivity of high-illuminance portions in the image can be decreased and the dynamic range can be widened. That is, the effective amount of incident light is controlled on a pixel to pixel basis, and the sensitivity of the high-illuminance portions is decreased, such that an image with great latitude can be acquired with a sufficient dynamic range.

Moreover, in the imaging element, the charge storage time can thus be controlled on a pixel to pixel basis to also control the sampling frequency of each pixel in accordance with the amount of incident light, and charges can be stored on a pixel to pixel basis for a time shorter or longer than the normal frame time of an image. Thus, on a high-illuminance side, the highlight side is suppressed, the sampling frequency increases, and the time resolution is improved. On the other hand, on a low-illuminance side, the charge storage time increases, and the sensitivity can be increased as much as the time resolution has been sacrificed.

Furthermore, since the charge storage time varies pixel by pixel, an image can be transmitted at a different sampling frequency for each pixel. The increase of the sampling frequency increases the time resolution of the image on the high-illuminance side, which is more effective. In addition, in order to display an image on a normal image device or the like, it is desirable that an image per pixel be once stored in a frame memory or the like and converted to a given frame frequency to create a final image.

The active filter 16 optically controls the amount of light transmitted to each portion of the imaging plane of each color channel in predetermined pixel units or predetermined image area units in accordance with the highlight suppression signal.

In the present embodiment, as shown in FIG. 2, an active optical filter which optically controls the highlight portions of the red and green channel images alone, that is, the active filter 16 is disposed in the vicinity of the imaging plane of the optical system, and the highlight suppression signal is used to optically suppress the highlights in the red and green channel images.

Here, for example, an electronically controllable crystal liquid element can be used to form the active filter 16.

Furthermore, the active filter 16 can comprise an element which controls the amount of transmitted light in accordance with the intensity of incident light instead of the electronic control. In addition, it is possible to independently use such an element capable of directly responding to the intensity of light and changing the transmittance by itself in accordance with the amount of irradiated light instead of the electronic control. However, this element is more effective if it is used with the electronically controllable active filter such as the liquid crystal element in a stacked state.

Moreover, although not specifically shown in the drawings, the active filter 16 can have a multilayer structure in which elements for control of the amount of transmitted light are arranged on a plurality of stages. That is, the active filter 16 can have a plurality of stages of element planes such as liquid crystal planes for controlling the amount of transmitted light in predetermined pixel units or image area units. In this manner, the light which penetrates the active filter 16 passes the multilayered liquid crystal elements one after another, and each of the liquid crystal planes can be electronically controlled to drastically control the amount of transmitted light in a broader range. The active filters 16 in the present embodiment are light transmitting filters and can be, in principle, used in a stacked manner. If a plurality of stages of optional active filters is used in a multilayered manner, it is possible to resist a strong intensity of light such as sunlight in outer space and to maintain the sensitivity of a bare CCD with respect to weak light. Thus, the active filter 16 permits the dynamic range of light transmission to be selected as desired. In particular, drastic control of the amount of transmitted light is required to realize a highlight-suppressed image according to the third embodiment described later, to which the multilayered structure of the active filter 16 is especially effective.

Here, all of the multilayered element planes of the active filter 16 may be controlled by the same highlight suppression signal, but independent highlight suppression signals are effectively used for the respective planes when the element planes are used which have nonlinear transmission characteristics for the amount of transmitted light or when the element planes different in material and characteristics are multilayered from the beginning. In this case, there is a plurality of highlight suppression signals. However, since the light transmission characteristics of the element planes are known in advance, the relation between the strength of the highlight suppression signals of the respective element planes and the amount of highlight suppression for light is already known. Moreover, from their characteristics, it is possible to obtain the amount of highlight suppression for light in the entire filter in which the multilayered element planes are stacked. Therefore, as in the third embodiment described later, even when an image signal is produced from the amount of highlight suppression, the suppression amounts of the individual layers can be synthesized to produce an image signal.

Figure 5B:
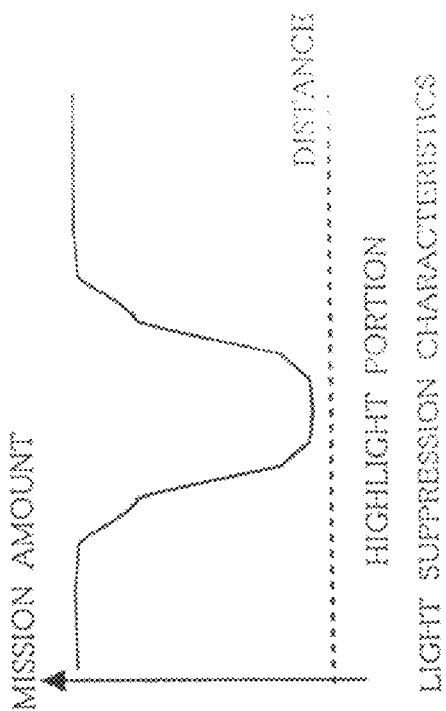
Figure 5A:
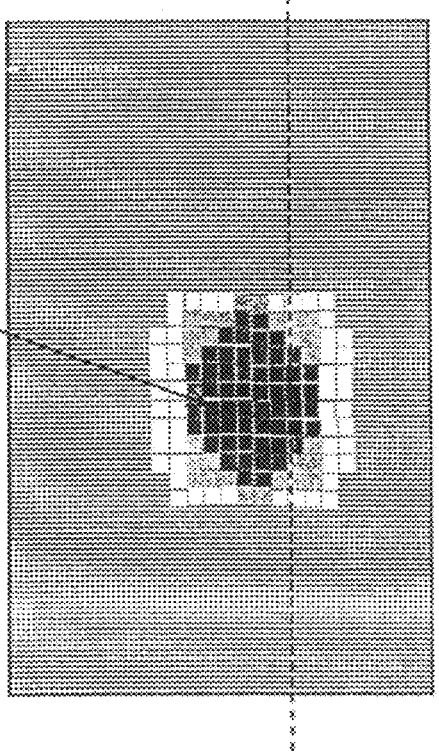

FIGS. 5 schematically show the state of the active filter surface. As shown in FIG. 5(*a*), in the active filter, the transmission amount of light is controlled per pixel, and such an optical suppression effect as to block light is exerted in the highlight portion. For example, the light suppression effect as shown in FIG. 5(*b*) can be generated.

Suitable optical suppression is thus given by the active filter 16, such that the light amount is increased by a diaphragm or the like correspondingly, and consequently, an image can be produced with a good S/N ratio in the imaging element 15.

It is to be noted that the active filter 16 can be configured as a shutter which controls the transmission time of transmitted light to control the amount of light transmitted to the imaging plane of each color channel. That is, the active filter 16 can not only optically control the amount of transmitted light on the basis of the highlight suppression signal but also can electronically control the transmission time in order to control the amount of transmitted light. Thus, the active filter 16 can function as an optical shutter.

When such a shutter function is given to the active filter 16, elements having good light on-off characteristics are used to construct the active filter 16, and these elements are arranged in a planar manner on a pixel to pixel basis, thereby enabling an effective shutter function.

Moreover, the active filter can also be configured by use of a light amount suppressing element such as a liquid crystal element capable of controlling, in each dot, the amount of transmitted light used in, for example, a liquid crystal type projector.

Here, the active filter 16 is disposed in the vicinity of the focal plane 14 of the optical system 10. The active filter 16 is disposed in the vicinity of the focal plane because each point of the image can only be optically controlled by the focal plane. For example, when the active filter 16 is attached to a lens opening, the light amount in each point of the image can not be controlled even if the light amount in the overall image can be restricted. As shown in FIG. 2(*b*), when a normal lens is used (the lens system 11 shown in this drawing), the active filter 16 is disposed immediately before the imaging plane because the focus part (focal plane) 14 is located immediately before the imaging element 15. This makes it possible to independently control each point of the image focused on the imaging plane.

It is to be noted that, as shown in FIG. 2(*b*), since the CCD plane (imaging element plane) in itself is an imaging plane, the active filter in itself, strictly speaking, is not structurally an imaging plane and is slightly displaced forward from the imaging plane. This is rather preferable to produce a high-definition image. The reason is that the structural optical transmission characteristics possessed by the active filter directly influence the image if the active filter completely overlaps the CCD plane, and it is thus possible to reduce the optical adverse effects of the structure of the active filter on the image when the active filter is slightly displaced from the imaging plane.

Furthermore, the active filter element (active filter 16) as described above can be formed as a composite imaging element integrated with the CCD imaging element (imaging element 15). This eliminates, for example, the problem of the alignment of each of the imaging elements 15 with the active filter 16 in a manufacturing process of the present image pickup apparatus, and enables an image pickup apparatus with increased performance to be manufactured at low cost.

On the other hand, the active filter 16 is provided on the main unit side of the camera in the structure in which the active filter 16 is disposed immediately before the imaging plane 15 as shown in FIG. 2(*b*). Therefore, when the present invention is applied to the existing camera the existing 3-CCD camera, single plate type CCD camera or the like, it is necessary to change to a structure in which the CCD imaging element integrated with the active filter is provided in the camera main unit.

Here, for example, a relay image is once produced in the lens system, and the active filter 16 is disposed on the imaging plane thereof, thereby enabling the same effects as when the active filter is disposed immediately before the imaging plane. Therefore, if a dedicated lens is developed, the image is once focused within the lens optical system, and the active filter is disposed in the vicinity of the plane where the image is focused, thereby making it possible to realize the highlight suppression function of the present invention without modifying the camera main unit.

Figure 7A:
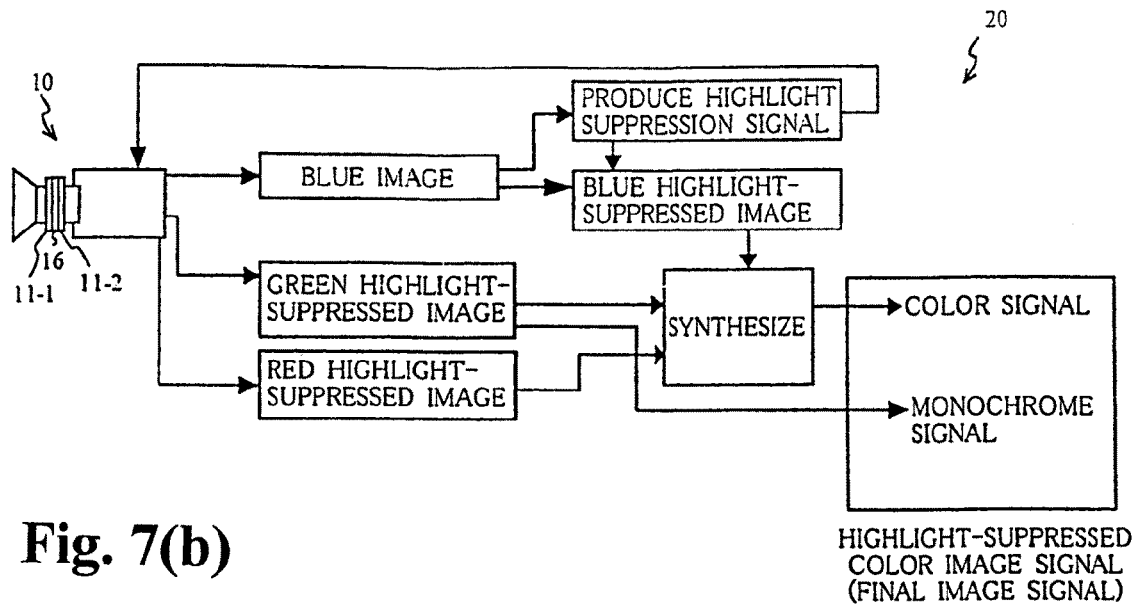
Figure 7B:
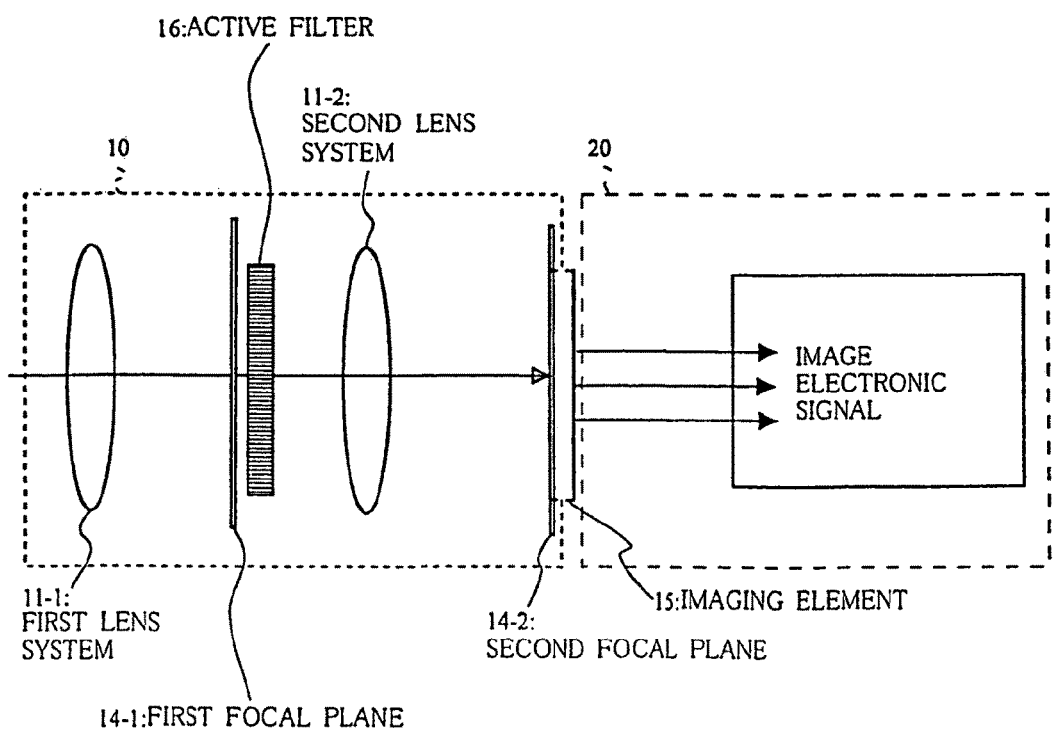

Therefore, in the present embodiment, a dedicated lens comprising the imaging plane and the active filter 16 can be provided in the lens system, as shown in FIGS. 6 and 7. In addition, in these drawings, the structure is similar to that of the image pickup apparatus shown in FIGS. 1 to 3 except for the lens system part where the active filter part 16 is disposed.

More specifically, as shown in FIG. 7(*b*), a first focal plane 14-1 is set in an air gap between a first lens system 11-1 and a second lens system 11-2. Further, the active filter 16 is disposed at the position of the first focal plane 14-1 or in the vicinity thereof (in the rear thereof in this drawing). A real image formed on the first focal plane 14-1 passes through the second lens system 11-2 and further through a third lens system and the like (not shown) as necessary, and is then formed on a second focal plane 14-2 on the imaging element.

In such a configuration, it is no longer necessary to set the active filter in the vicinity of the CCD imaging element and the second focal plane 14-2 located in the camera main unit, and the highlight suppression image pickup apparatus can be realized only by the modification of the lens system without changing the structure of the camera main unit.

Furthermore, the images of the respective color channels acquired via the CCD imaging elements as described above are output as electronic signals to the electronic system (apparatus part) 20.

In the electronic system (apparatus part) 20, the blue channel image output from the optical system 10 is acquired in the blue channel image producing part 21, as shown in FIG. 1. Then, this blue channel image is input to the highlight suppression signal producing part 22.

In the highlight suppression signal producing part 22, for example, a histogram of the input blue channel image is generated to extract the highlight portion from the acquired image, thereby generating a highlight suppression signal.

Here, the highlight suppression signal may be a binary suppression signal which only suppresses the highlight portion and does not suppress non-highlight portions, as described above. However, in the present embodiment, it is possible to produce non-binary suppression signals which vary in the level of suppression in accordance with the gradation of the original image acquired in the optical system 10 (see FIG. 8 described later), so that a highlight-suppressed image with higher definition can be obtained.

Then, this highlight suppression signal is sent to the active filter 16 of the optical system 10, and the light transmission amount of the active filter 16 is controlled (see FIG. 5). Thus, the red and green channel images are optically suppressed via the active filter 16, and red and green optically highlight-suppressed images are output to the electronic system 20 side and acquired in the highlight-suppressed image producing part 26.

Furthermore, as shown in FIG. 1, the blue channel image is also input to the blue channel matching part where the highlight is electronically suppressed by the highlight suppression signal from the highlight suppression signal producing part, and the blue channel image is then input to the blue channel highlight image signal outputting part 25.

In addition, since the suppression amount of the highlight in itself is the highlight image signal, the suppression of the highlight can be electronically cancelled by inverse transformation. Even in that case, the effects of the optical highlight suppression are maintained, so that it is possible obtain an image with no deterioration as compared with an image which is only electronically controlled in a conventional method.

Furthermore, in the present embodiment, the highlight suppression signal is input to the restore signal producing part 24, and produced and output as a restore signal for restoring the suppressed image of each channel to the gradation of the original image. The restore signal is produced as a non-binary signal indicating the gradation of the image in a manner similar to the highlight suppression signal (see FIG. 8), and input to the red and green channel image signal outputting part 27 and the blue channel image signal outputting part 25 to electronically restore-the contrast in the suppressed image of each channel so that a restored image can be obtained.

So far, the highlight-suppressed images of the three channels in total have been independently acquired: the electronically suppressed blue channel highlight-suppressed image, and the optically suppressed red channel suppressed image and green channel suppressed image.

These images of the three channels are input to the final image signal outputting part 28 where they are vectorially synthesized or matched in accordance with signal processing methods for the respective colors, and then output as a highlight-suppressed color image.

The image signal input to the red and green channel image signal outputting part 27 is a signal optically highlight-suppressed via the active filter 16, and if it is restored by the restore signal, an improvement of the S/N ratio can be expected. On the other hand, the image signal input to the blue channel image signal outputting part 25 is an electronically suppressed image, so that an improvement of the S/N can not be expected in principle. Thus, the output of the red and green channel image signal outputting part 27 is vectorially synthesized with the output of the blue channel image signal outputting part 25 in the final image signal outputting part 28, thereby making it possible to obtain an optically and electronically highlight-suppressed high-definition restored color image output. In the manner described above, a desired image captured in the optical system 10 is acquired as a highlight-suppressed image in which the highlight is properly suppressed.

Next, details of the highlight suppression signal in the image pickup apparatus of the present embodiment as described above will be explained referring to FIGS. 8 to 11.

First, the highlight suppression signal produced in the highlight suppression signal producing part 22 can not only optically suppress the highlight portion of the image alone, but also can suppress, from its principle, a portion at any brightness and at any position without limiting to the highlight portion. It is widely known that the imaging element always generates weak noise and this has a strong influence in a dark place.

Therefore, as shown in FIG. 8, the highlight suppression signal of the present embodiment is produced not as a binary signal but as a non-binary signal having gradation, and can be set so that it is given a suitable optical feedback. If such a non-binary highlight suppression signal having gradation is used, it is possible to enhance the S/N of the image and to therefore obtain a high-quality image.

More specifically, the highlight suppression signal can be produced in the highlight suppression signal producing part to have gradation so that the suppression is stronger in the highlight and weaker in the lowlight in the overall image without suppressing the highlight portion alone, as shown in FIGS. 8. In addition, the "suppression" is not limited to the highlight portion in such a suppression signal, and it is thus considered that the name of the signal should not necessarily be the "highlight suppression" signal. However, as the highlight portion is more strongly suppressed, it is appropriate to call it the "highlight suppression signal". It goes without saying that other names can be freely adopted.

Figure 8A:
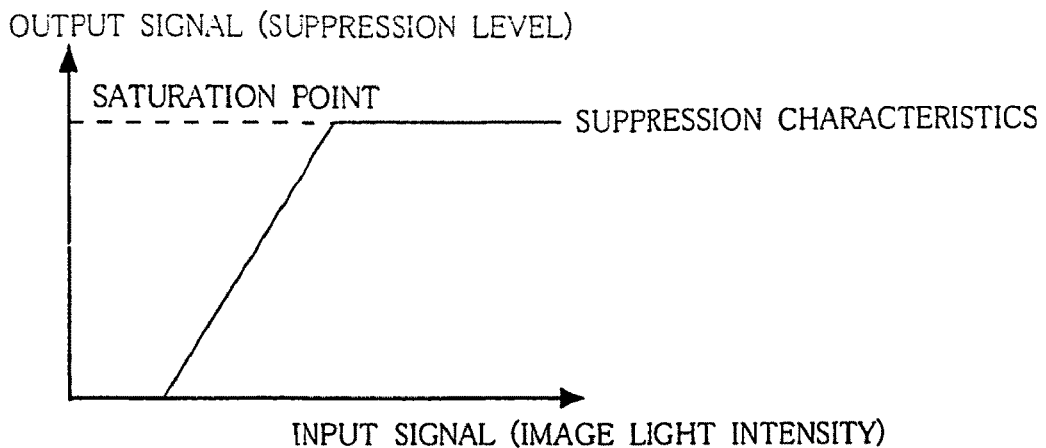
FIGS. 8(a), 8(b) and 8(c) are graphs showing the characteristics of a highlight suppression signal obtained in the highlight suppression image pickup apparatus according to the first embodiment of the present invention.
Figure 8B:
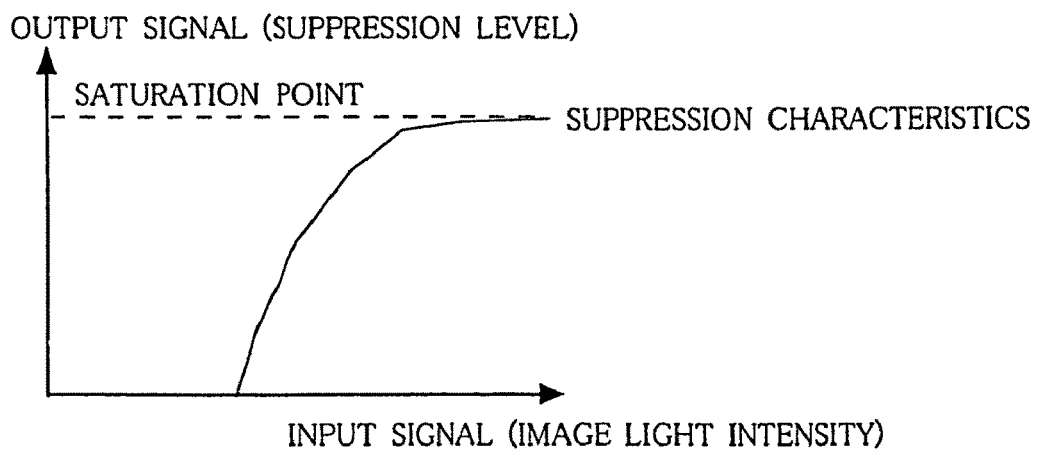
Figure 8C:
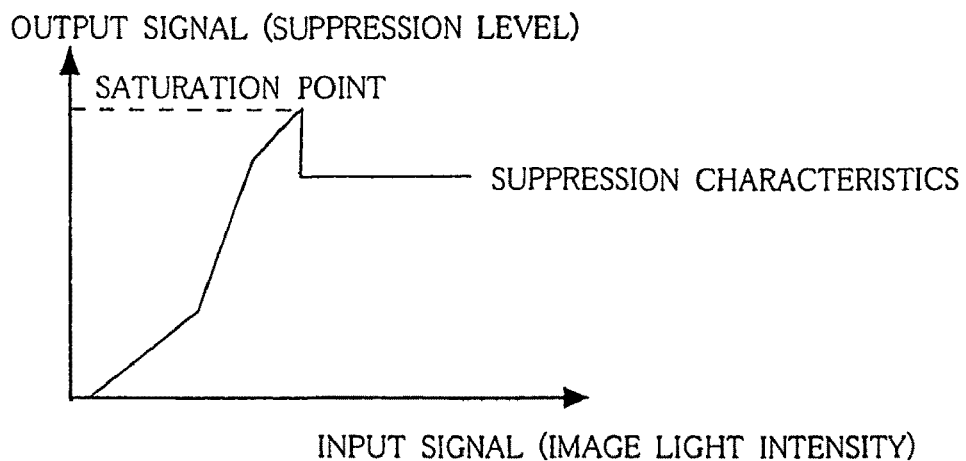

A suppression characteristic in FIG. 8(a) concerns a case where an input-output relation is a linear relation, wherein the level of suppression is fixed at the point of saturation. A suppression characteristic in FIG. 8(b) is based on a nonlinear input-output relation considering the characteristics of the CCD. A suppression characteristic in FIG. 8(c) concerns a case where the suppression is set to be, on the highlight, especially strong but lower than the suppression at the saturation point.

An advantage of producing the highlight suppression signal with such non-binary suppression characteristics is that this suppression signal can also be used as a restore signal for restoring the suppressed image.

The use of the suppression signal with the same characteristics as the restore signal to restore the image signal enables correct restoration even if the suppression characteristics are linear or nonlinear. Thus, any linear suppression signal can be used as the restore signal, such that the best suppression signal (=restore signal) can be set only considering the characteristics of the CCD imaging element and the S/N characteristics. This means that a final result is hardly affected even if the accuracy of the suppression signal is poor, and that a distortion rate in the characteristics of a final image in the active filter is significantly low.

When the non-binary highlight suppression signal and restore-signal as described above are used to acquire an image, a highlight-suppressed image as shown in FIG. 9 can be obtained, for example.

Figure 9A:
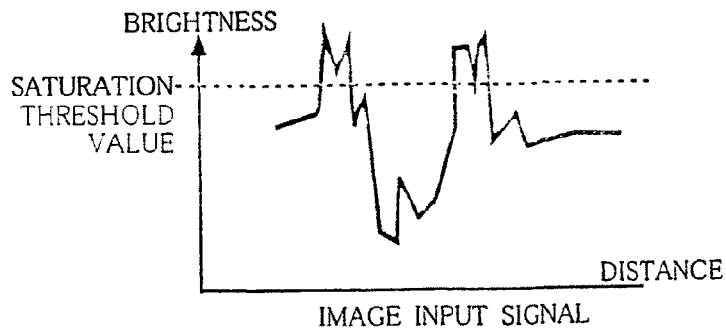
Figure 9B:
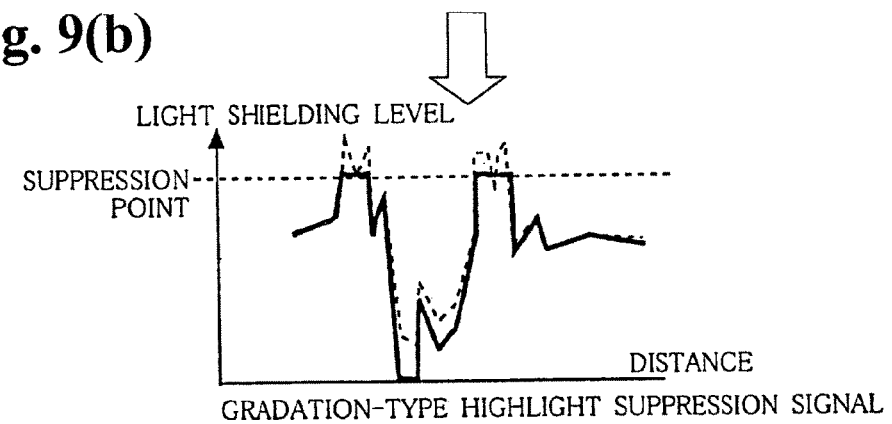

An image input signal shown in FIG. 9(a) has two strong highlight portions exceeding a saturation threshold value. A blue signal alone is taken out from here to produce a gradation-type highlight suppression signal as shown in FIG. 9(b). In FIG. 9(b), highlights exceeding a suppression point are set to have a fixed value (see FIG. 10(a)).

Figure 9C:
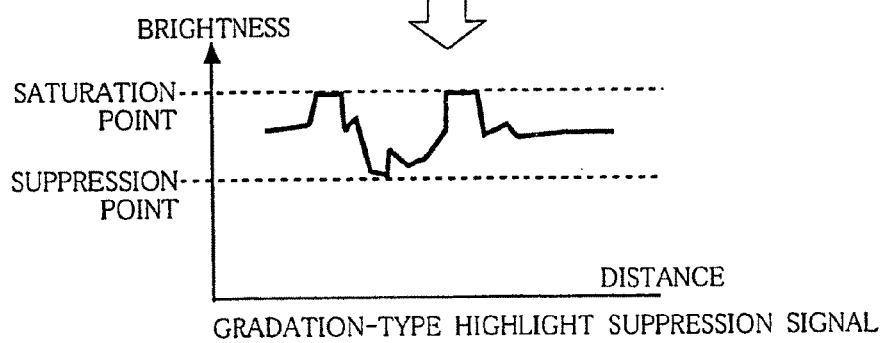

The active filter 16 is driven in accordance with this suppression signal, such that an input image is optically suppressed, and a suppressed image can be acquired using portions with good S/N characteristics of the imaging element. The image signal of the red and green channels acquired with this suppression signal has a curve as shown in FIG. 9(c). Here, the dynamic range of the signal is once narrowed.

The blue channel image is also electronically highlight-suppressed with the same suppression signal, and signal characteristics thereof are brought into coincidence with the signal characteristics of the red and green channel images.

Figure 9D:
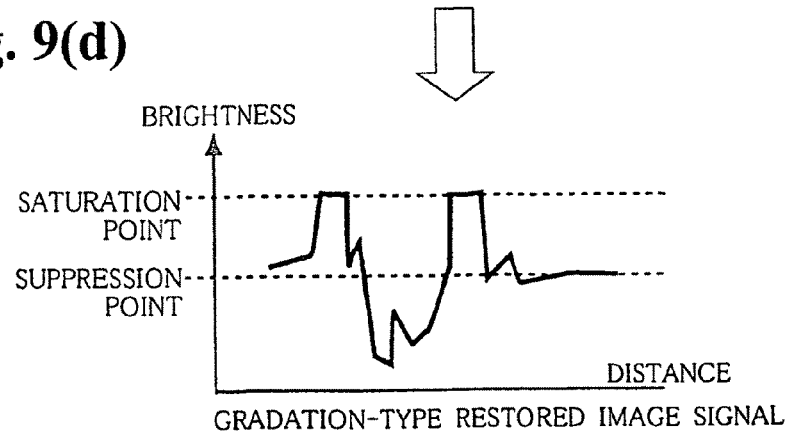

Then, the images of the channels of three colors are vectorially synthesized and restored by the restore signal, such that a final color image as shown in FIG. 9(d) can be obtained.

As shown in FIG. 9(d), the restored final color image is output as an image in which the highlight portions exceeding the saturation point are only suppressed and other portions show gradation identical with the gradation of the original image (see FIG. 9(a)).

In the manner described above, a high-definition highlight-suppressed image can be obtained.

In addition, the highlight suppression signal is not limited to the signal with the non-binary signal characteristic having the gradation as described above, and it is also possible to use a binary signal which suppresses the highlight portion alone.

Figure 10A:
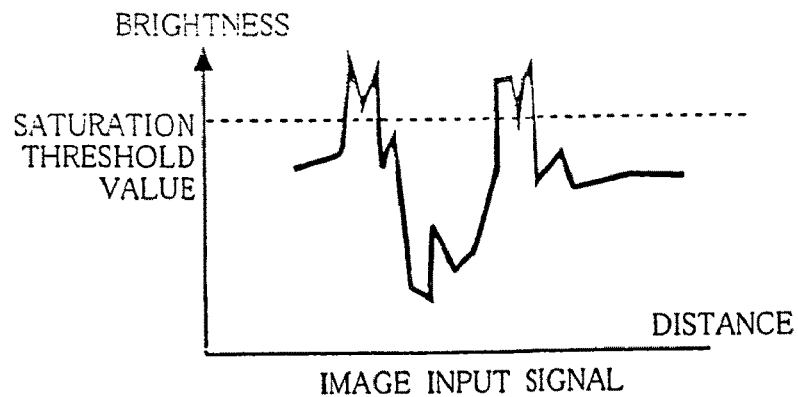
Figure 10B:
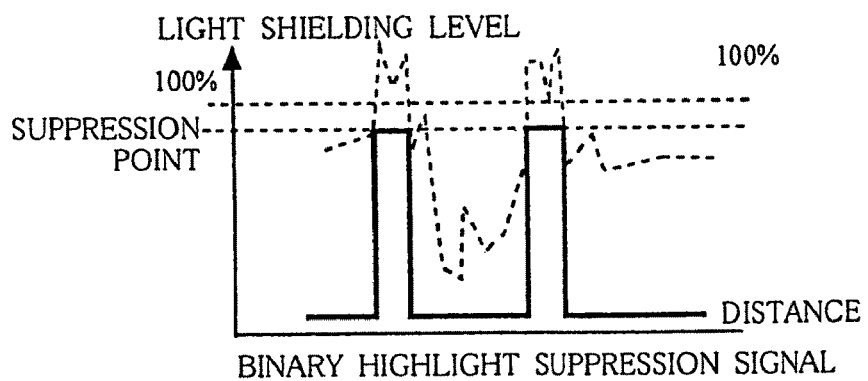
Figure 10C:
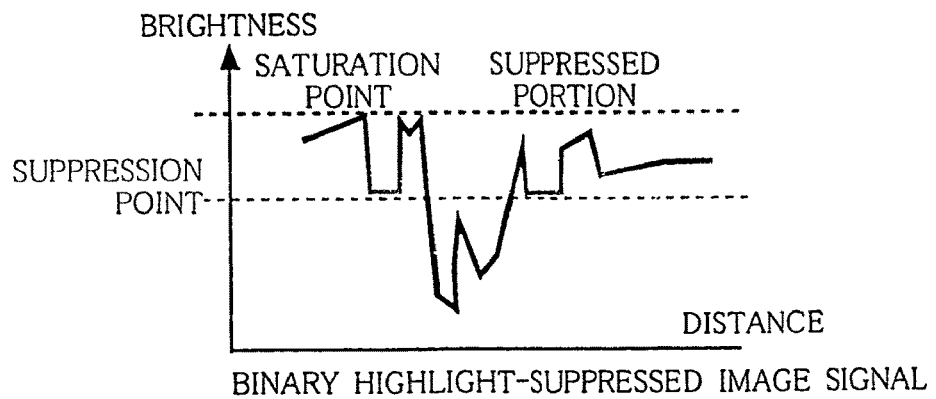

An image signal obtained with the binary suppression signal is shown in FIGS. 10. In this case, highlight portions exceeding the saturation threshold value shown in FIG. 10(a) are only suppressed with the binary suppression signal as shown in FIG. 10(b), and an image as shown in FIG. 10(c) is obtained as a final image.

Furthermore, as described above, in the present embodiment, the active filter 16 can control the transmission time of transmitted light to control the amount of light transmitted to the imaging plane of each color channel. Thus, the active filter 16 can not only optically control the amount of transmitted light on the basis of the highlight suppression signal but also can function as an optical shutter which electronically controls the transmission time to control the amount of transmitted light.

FIGS. 11 show an advantage when the optical shutter function is added to the active filter 16 as described above to electronically control the transmission time per pixel and thus control the amount of transmitted light.

FIGS. 11 show a case where the sensitivity is controlled and lowered.

Figure 11A:
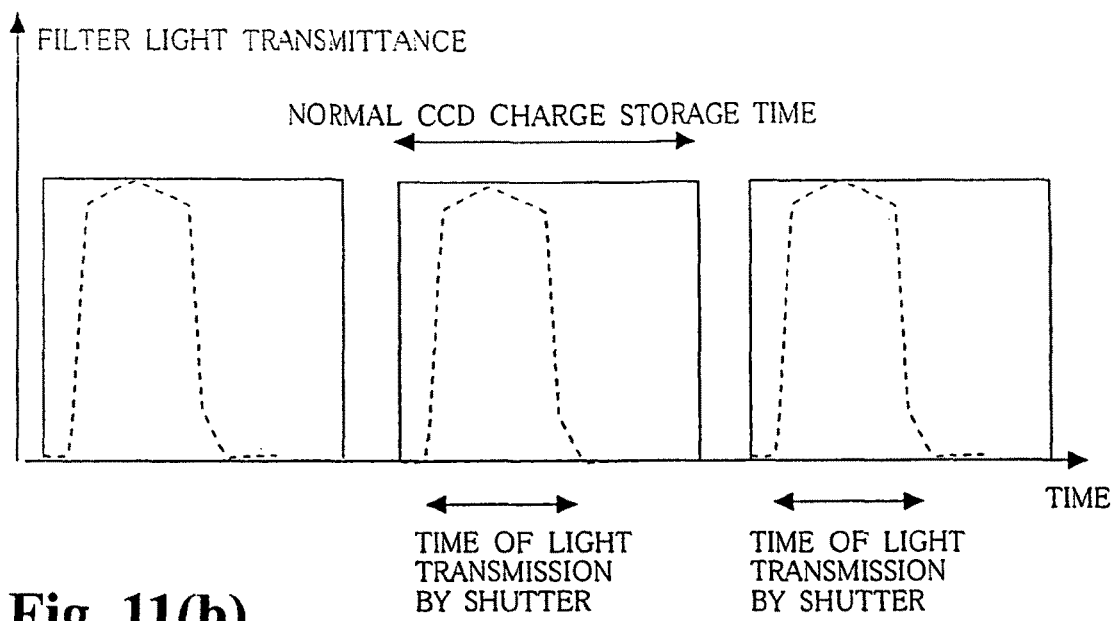
Figure 11B:
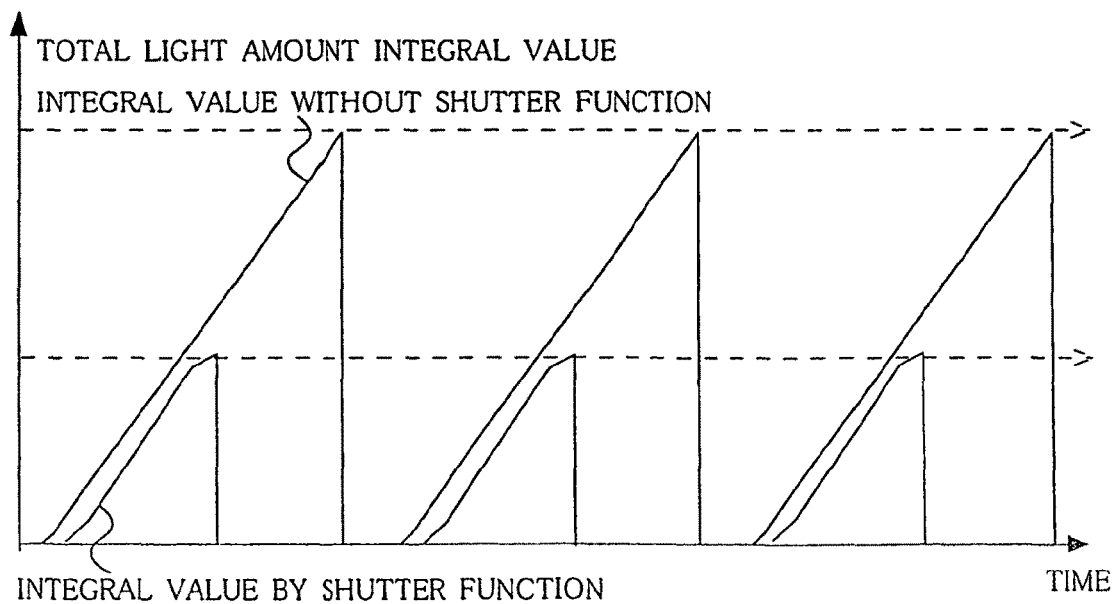

As shown in FIG. 11(a) in which a vertical axis indicates light transmittance of the active filter 16 and a horizontal axis indicates a time axis, normal CCD charge storage time is controlled by a shutter, such that the light transmission time can be controlled. As a result, it is apparent from a light amount integral value shown in FIG. 11(b) that reducing exposure time in the highlight portion permits an increase in time resolution and a decrease in sensitivity.

In the same manner, in the lowlight portion, exposure time can be increased to increase the charge storage time for an increase in sensitivity.

As described above, the highlight suppression image pickup apparatus according to the present embodiment such as the 3-CCD color camera or the single plate type CCD camera comprises: the optical system (camera part) 10 capable of obtaining a desired image through the three red, green and blue color channels; and the electronic system (apparatus part) 20 for processing the image signals, wherein a highlight portion can be extracted from an output image of the blue channel among three kinds of image outputs to produce a highlight suppression signal. This highlight suppression signal can be used as a highlight suppression signal for producing images of the red and green channels to control the active filter 16.

Then, the active filter 16 comprising a liquid crystal element or the like is controlled by the highlight suppression signal, and an area for highlight-suppressed portions is generated on the active filter part 16. the portions corresponding to the highlight portions of the red and green channel images are optically controlled before the light reaches the imaging element, such that an image in which the highlight is suppressed can be produced, and a high-quality highlight-suppressed image can be obtained.

[Second Embodiment]

A second embodiment of a highlight suppression image pickup apparatus of the present invention will next be described referring to FIGS. 12 to 14.

Figure 12:
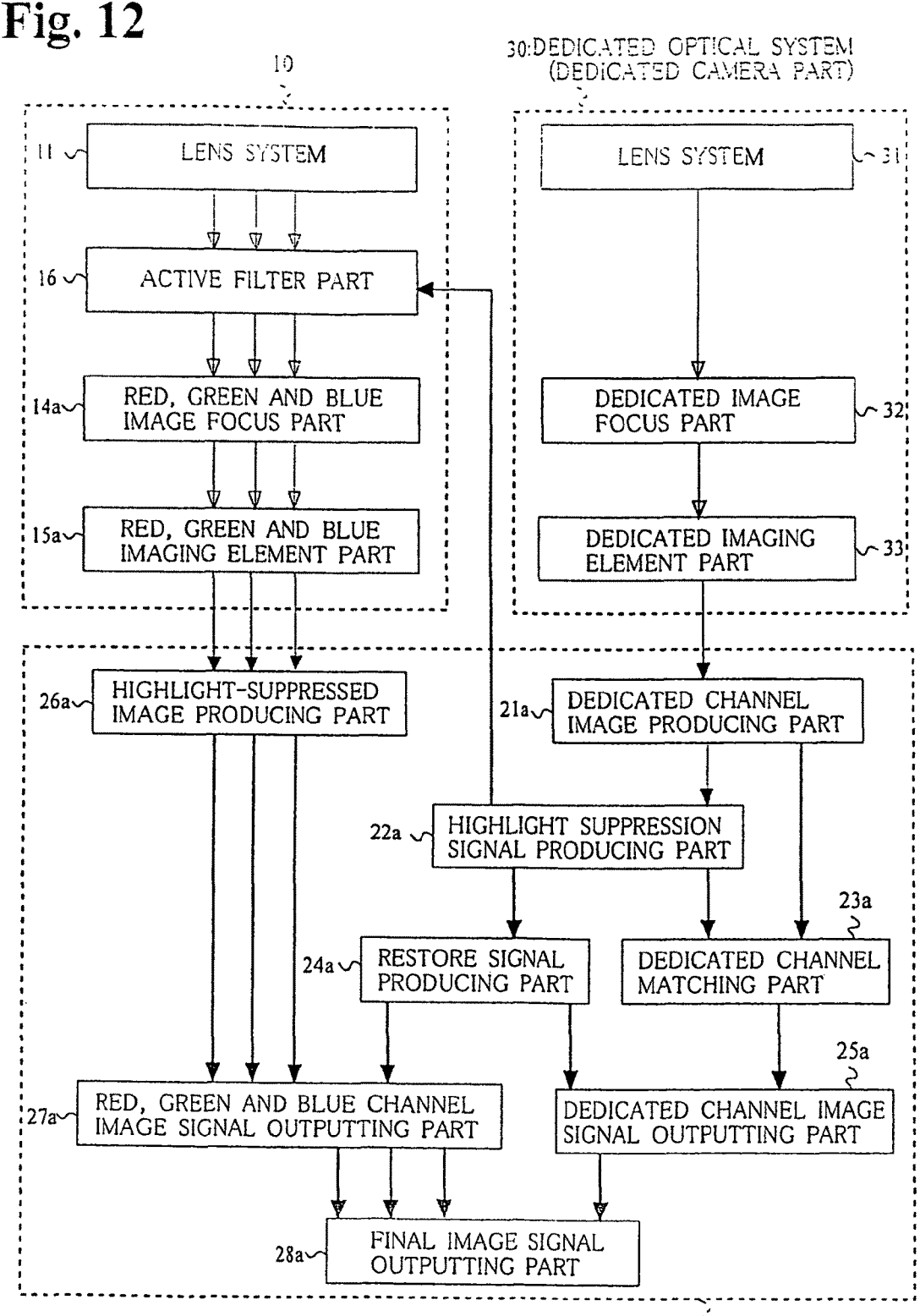
FIG. 12 is a block diagram showing the schematic configuration of a highlight suppression image pickup apparatus according to a second embodiment of the present invention.

FIG. 12 is a block diagram showing the schematic configuration of the highlight suppression image pickup apparatus according to the second embodiment of the present invention. FIG. 13 is an explanatory diagram schematically showing one example of the entire highlight suppression image pickup apparatus shown in FIG. 12. FIG. 14 is an explanatory diagram schematically showing another example of the highlight suppression image pickup apparatus shown in FIG. 12, and is a detail diagram of a prism, CCDs and active filters provided in an optical system of a 3-CCD camera.

As shown in these drawings, in the highlight suppression image pickup apparatus of the present embodiment, there are separately configured an optical system (main camera part) 10 as an image acquiring optical system which serves as a channel for acquiring a desired image, and a dedicated optical system (dedicated camera part) 30 which serves as a channel for a highlight suppression signal. The configuration is similar to that in the first embodiment in other respects.

Figure 13:
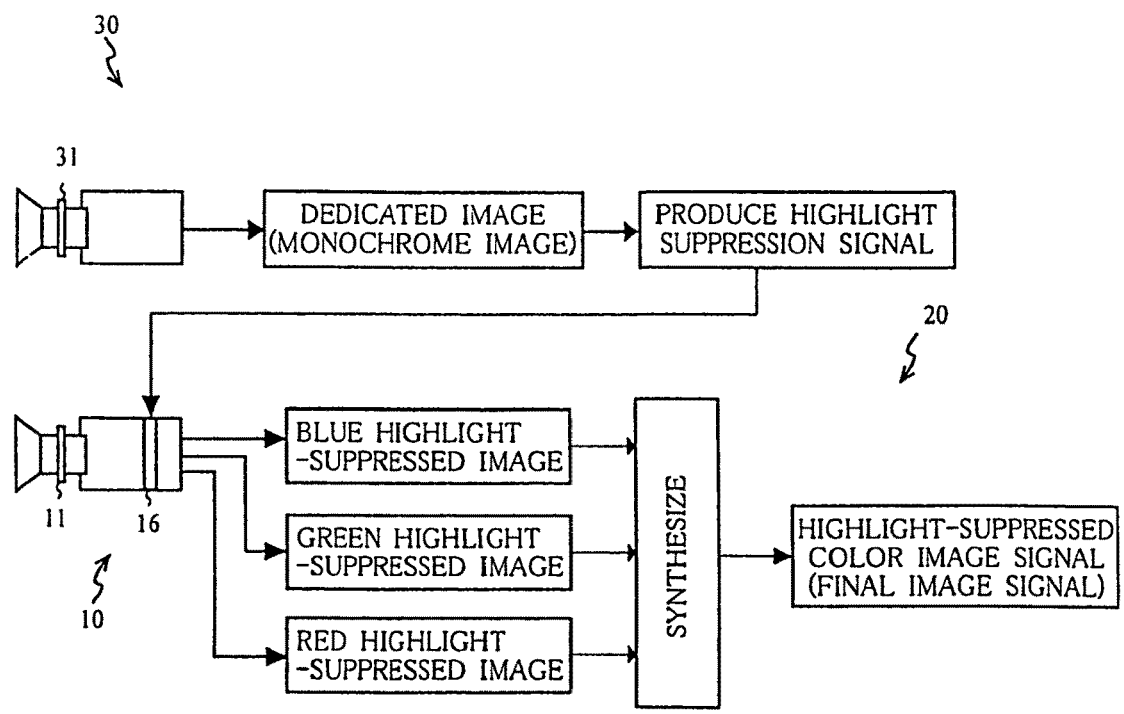
FIG. 13 is an explanatory diagram schematically showing the entire highlight suppression image pickup apparatus shown in FIG. 12.
Figure 14:
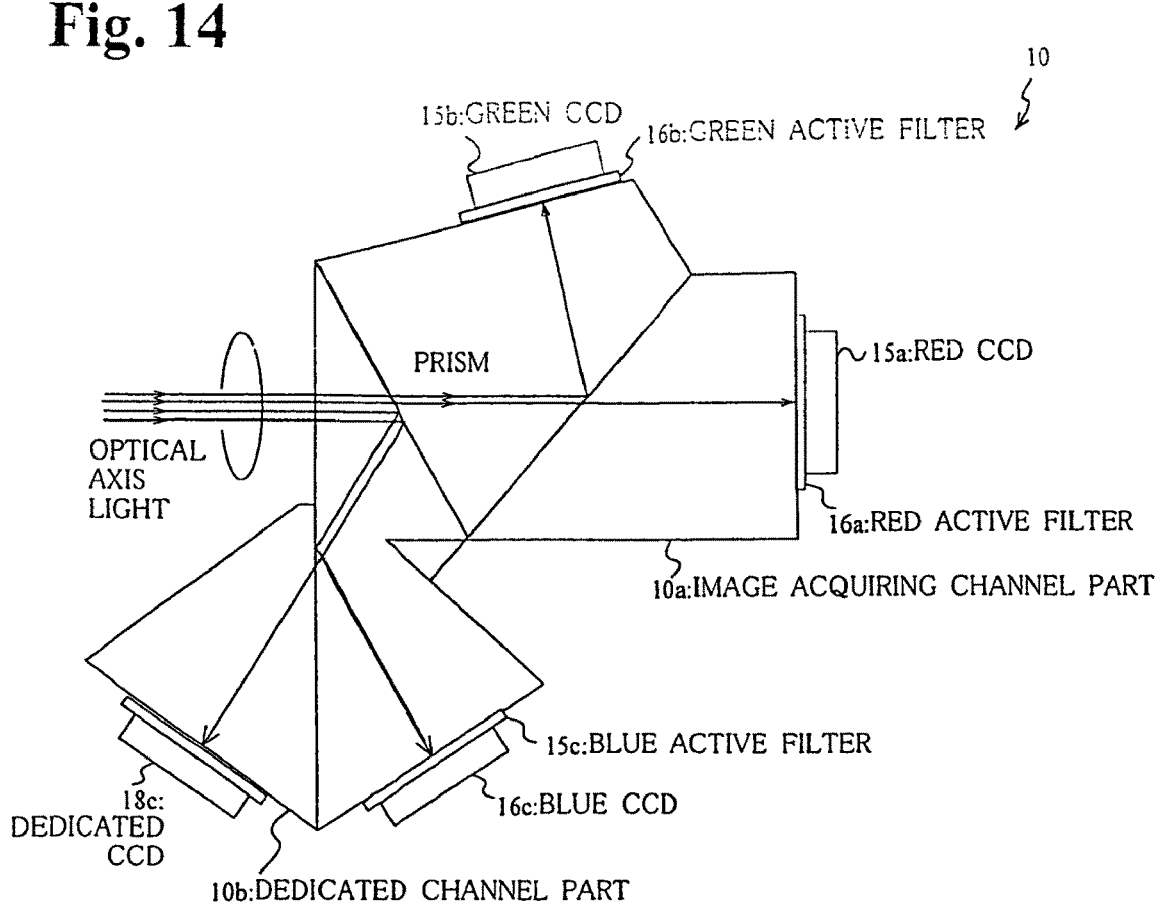
FIG. 14 is an explanatory diagram schematically showing another example of the highlight suppression image pickup apparatus shown in FIG. 12, and is a detail diagram of a prism, CCDs and active filters provided in an optical system of a 3-CCD camera.

More specifically, as shown in FIG. 13, there are arranged the main camera part 10 comprising a color camera for image acquisition, and the dedicated camera part 30 serving as a dedicated independent channel for producing the highlight suppression signal. In addition, as shown in FIG. 13, the dedicated camera part 30 comprises components necessary for image acquisition such as a lens system 31, a dedicated image focus part 32 and a dedicated imaging element part 33. Output images are associated with each other between an image output of the main camera part 10 and an image output of the dedicated channel part 30.

Then, for example, a histogram of the output of the dedicated channel part 30 is generated to extract the highlight portion from the image of the dedicated channel, and a highlight suppression signal can be produced from the extracted signal. An electronic system 20 (apparatus part) for producing a highlight suppression signal and acquiring a final image is similar to that in the first embodiment.

Here, the optical system 10 for image acquisition and the optical system 30 dedicated to the highlight suppression signal do not need to have independent camera structures as shown in FIG. 13. For example, as shown in FIG. 14, an image acquiring channel part 10*a* and a dedicated channel portion 10*b* for the highlight suppression signal may be integrally provided in one optical system 10 (prism). In this manner, it is no longer necessary to separately provide the two camera parts including the main camera part and the dedicated camera part as shown in FIG. 13, thereby enabling the simplification of the configuration of the entire image pickup apparatus, a weight reduction thereof, etc.

As described above, in the present embodiment, there are provided the camera part (main camera part 10) serving as the image acquiring channel and the camera part (dedicated camera part 30) serving as the channel dedicated to the highlight suppression signal, or there is separately provided a dedicated channel for producing the highlight suppression signal in addition to the red, green and blue channels. Thus, the red, green and blue images can be optically suppressed by the highlight suppression signal produced in the dedicated part, thereby making it possible to create more complete highlight suppression effects.

In addition, an example of the image pickup apparatus which is a 3-CCD camera has been described in the present embodiment, but it goes without saying that the image pickup apparatus may be a single plate type CCD camera as in the first embodiment described above.

[Third Embodiment]

A third embodiment of a highlight suppression image pickup apparatus of the present invention will next be described referring to FIGS. 15 to 17.

Figure 15:
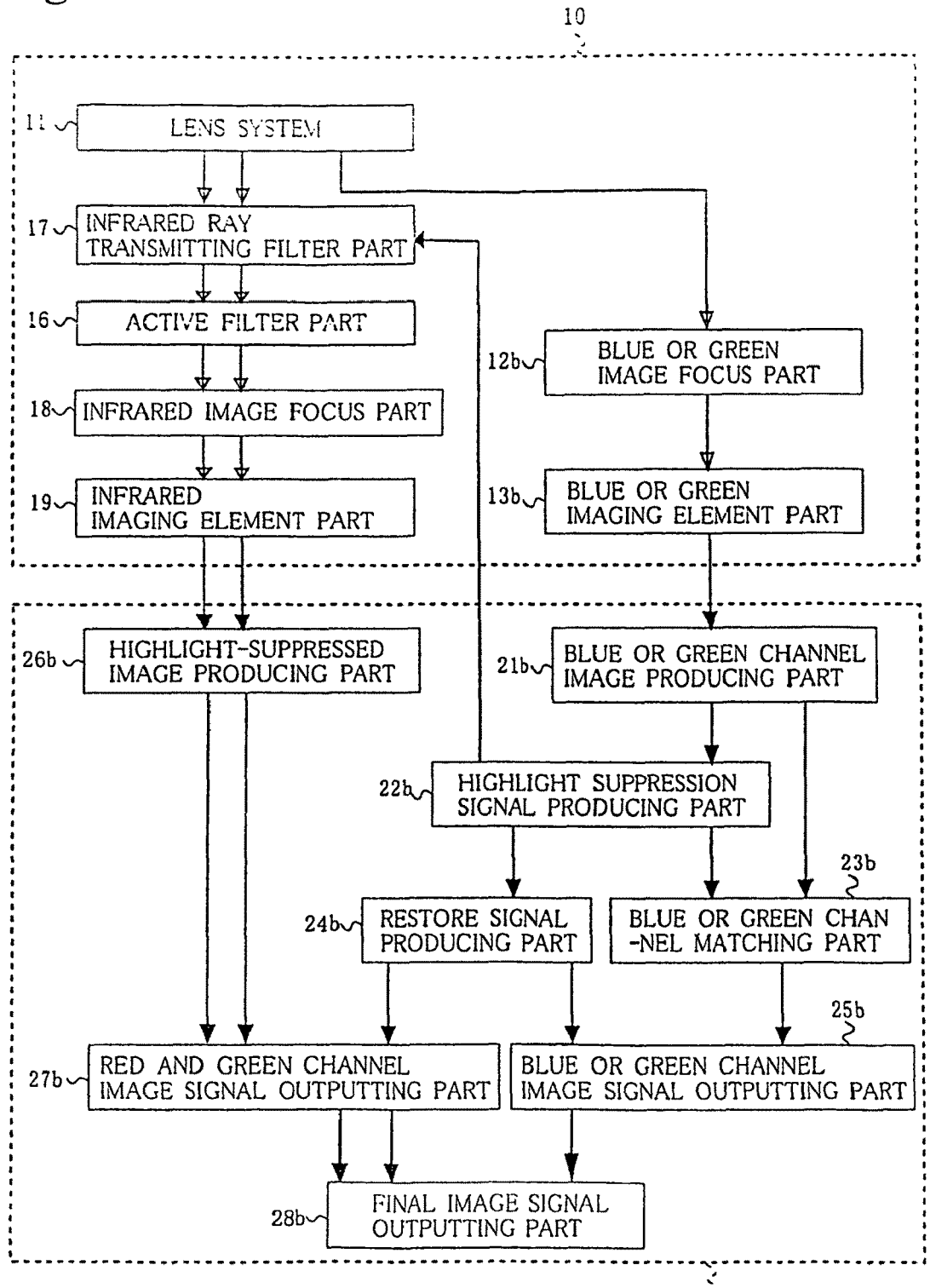
FIG. 15 is a block diagram showing the schematic configuration of a highlight suppression image pickup apparatus according to a third embodiment of the present invention.

FIG. 15 is a block diagram showing the schematic configuration of the highlight suppression image pickup apparatus according to the third embodiment of the present invention. FIG. 16 is an explanatory diagram schematically showing the entire highlight suppression image pickup apparatus shown in FIG. 15.

As shown in these drawings, in the highlight suppression image pickup apparatus of the present embodiment, an optical system for acquiring an image forms an infrared camera capable of acquiring an infrared image. The configuration is similar to that in the first embodiment in other respects.

The principle when a highlight-suppressed image is acquired from the infrared image is basically similar to the principle in the case of a visible light image in the first embodiment described above.

However, the highlight suppression signal for the infrared image is desirably produced from a green or blue image other than a red image.

Figure 17:
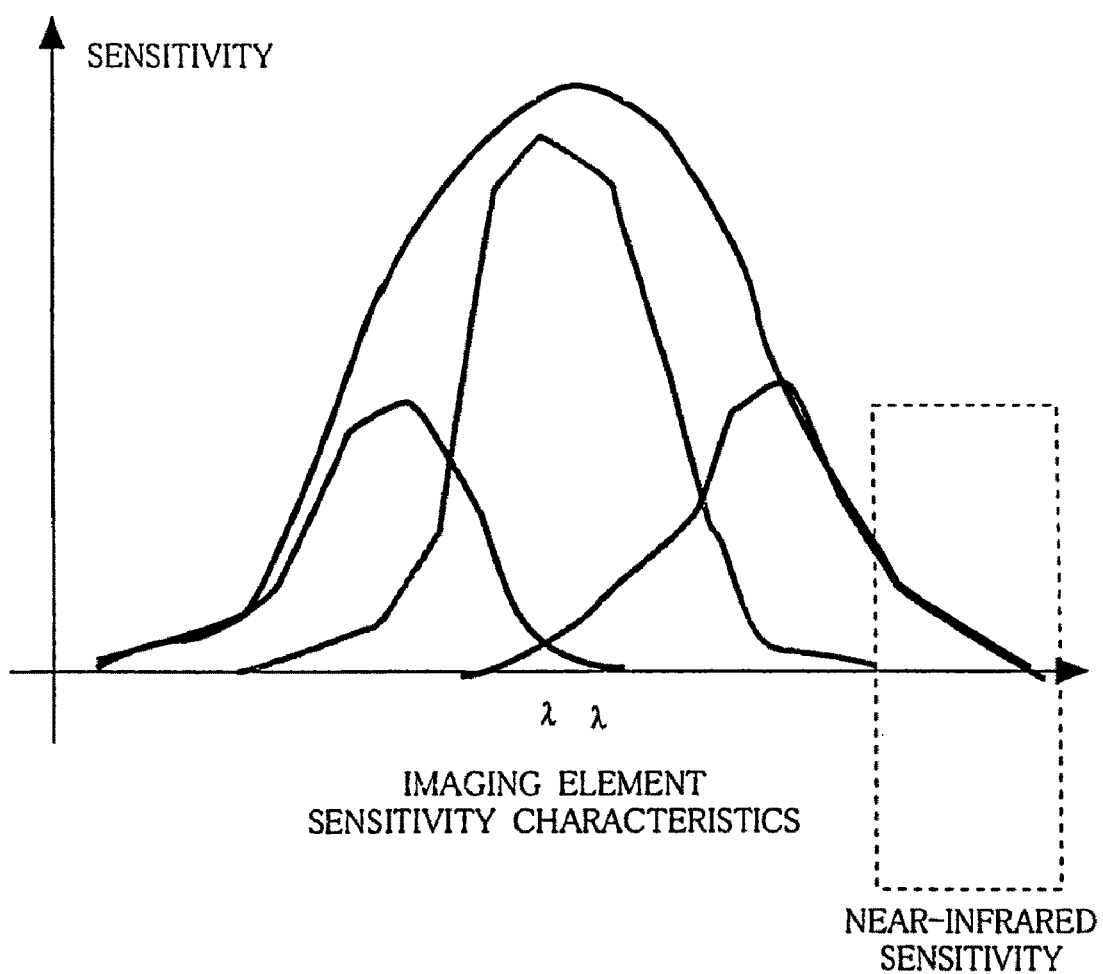
FIG. 17 is a graph showing the sensitivity characteristics of an imaging element part.

In general, an imaging element used in a color camera has wavelength sensitivity characteristics as shown in FIG. 17. Moreover, the wavelength sensitivity characteristics of a CCD element for red have some sensitivity to near-infrared rays, as indicated by broken lines in FIG. 17. Therefore, by use of such sensitivity characteristics of the CCD element, an infrared image can be produced to acquire a desired highlight-suppressed infrared image.

Figure 16:
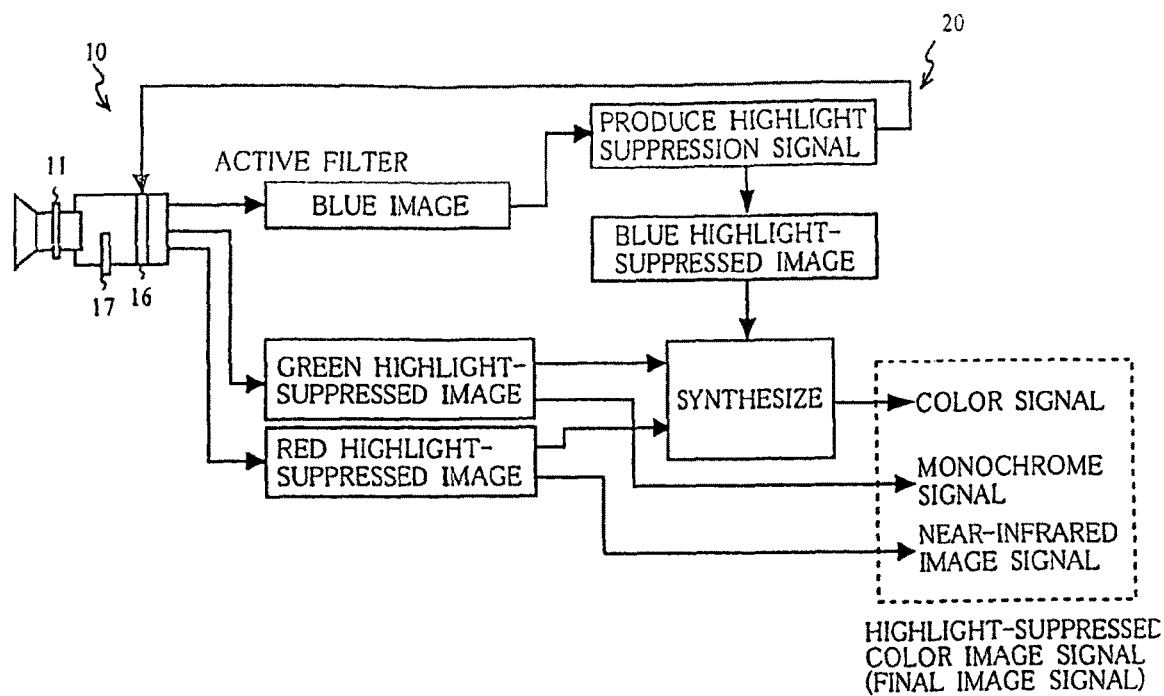
FIG. 16 is an explanatory diagram schematically showing the entire highlight suppression image pickup apparatus shown in FIG. 15.

More specifically, as shown in FIGS. 15 and 16, an optical system 10 and an electronic system 20 similar to those in the first embodiment are used. In a red channel of the optical system 10, there are provided an infrared ray transmitting filter 17, an infrared image focus part 18 and an infrared imaging part 19. A near-infrared image is acquired through an optical filter.

Moreover, a blue or green channel is used to acquire a highlight suppression signal. The configuration and function are similar to those in the first embodiment in other respects.

In such a configuration, the image pickup apparatus of the present embodiment can be used as an infrared camera, so that it is possible to realize an infrared image pickup apparatus suitable to suppress highlight in an image at night in which quality deteriorates due to, for example, the headlights of the automobiles.

Furthermore, if this image pickup apparatus adapted to infrared images is combined with the image pickup apparatus in the first embodiment, the same camera can be used as a color image camera in the daytime and as an infrared image camera at night.

[Fourth Embodiment]

A fourth embodiment of a highlight suppression image pickup apparatus of the present invention will next be described referring to FIGS. 18 and 19.

Figure 18:
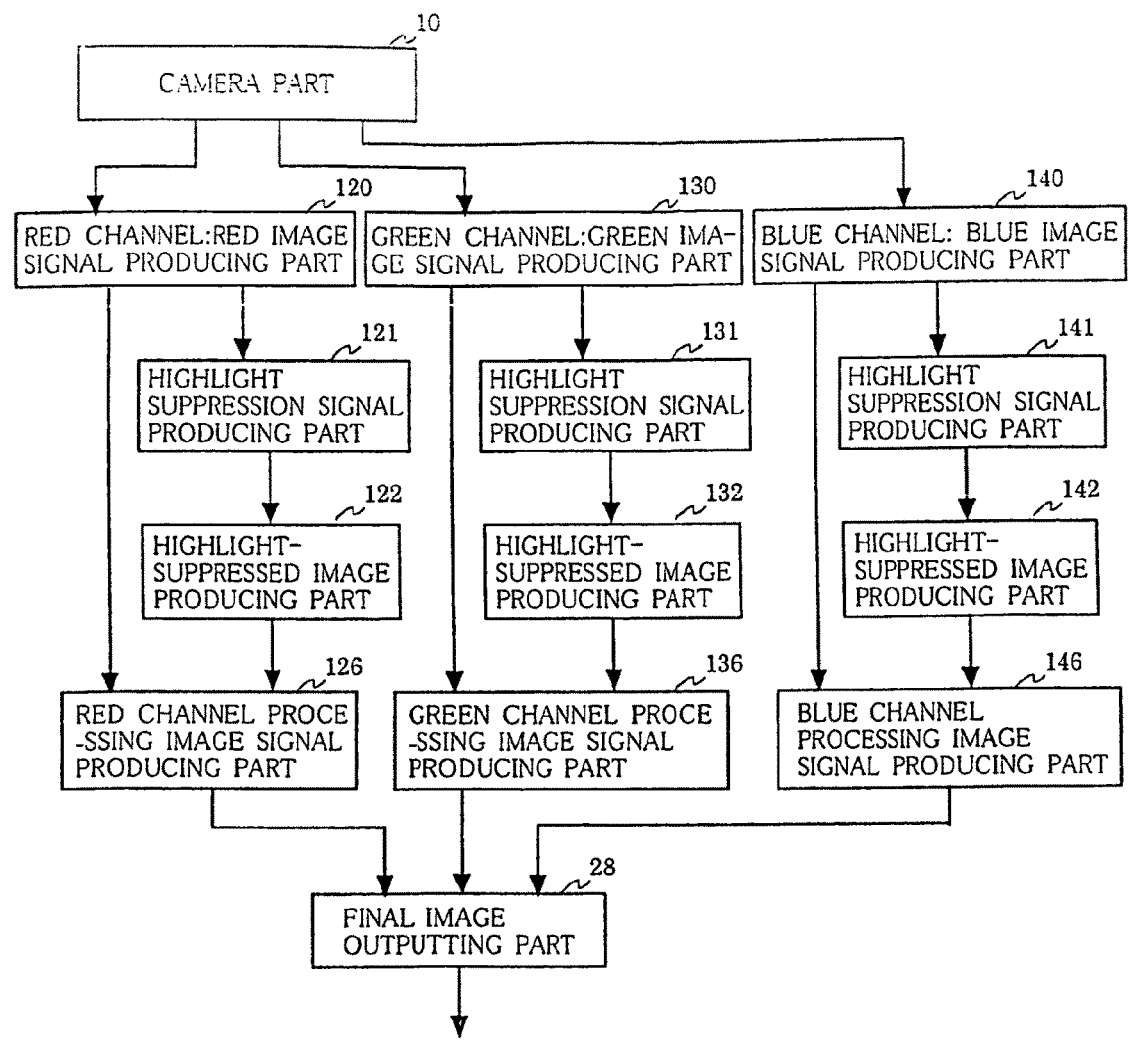
FIG. 18 is a block diagram showing the schematic configuration of a highlight suppression image pickup apparatus according to a fourth embodiment of the present invention.

FIG. 18 is a block diagram showing the schematic configuration of a highlight suppression image pickup apparatus according to the fourth embodiment of the present invention. FIGS. 19 are graphs showing image signals and highlight suppression signals obtained in color channels in the highlight suppression image pickup apparatus according to the present embodiment.

In the highlight suppression image pickup apparatus of the present embodiment shown in these drawings, a highlight suppression signal is produced for each color channel so as to correspond to each of the color channels (RGB) of the image acquired in a camera part. The configuration is similar to that in the first embodiment in other respects.

As shown in FIG. 18, in the present embodiment, an image acquired in a camera part 10 is output to a red image signal producing part 120, a green image signal producing part 130 and a blue image signal producing part 140 corresponding to the respective color channels (RGB).

The image signal producing parts comprise highlight suppression signal producing parts 121, 131 and 141, highlight-suppressed image producing parts 122, 132. and 142 and color channel processing image producing parts 126, 136 and 146, respectively. Each of the highlight suppression signal producing parts 121, 131 and 141 comprises an active filter corresponding to each color (not shown).

Furthermore, highlight-suppressed images which have penetrated the active filters and optically suppressed are produced in the respective color channels, and the produced highlight-suppressed images are synthesized in a final image signal outputting part 28 and thereby output as a final highlight-suppressed image. Thus, in the present embodiment, an optimum image can be obtained in each color channel, and then image signals of the respective color channels can be synthesized to produce and output an image signal.

Figure 19A:
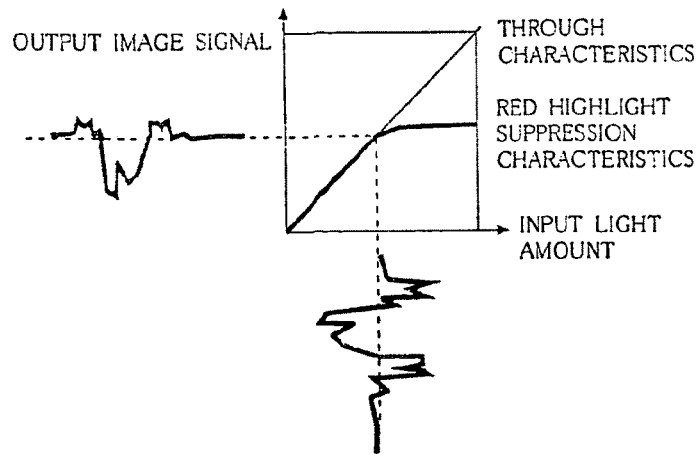
Figure 19B:
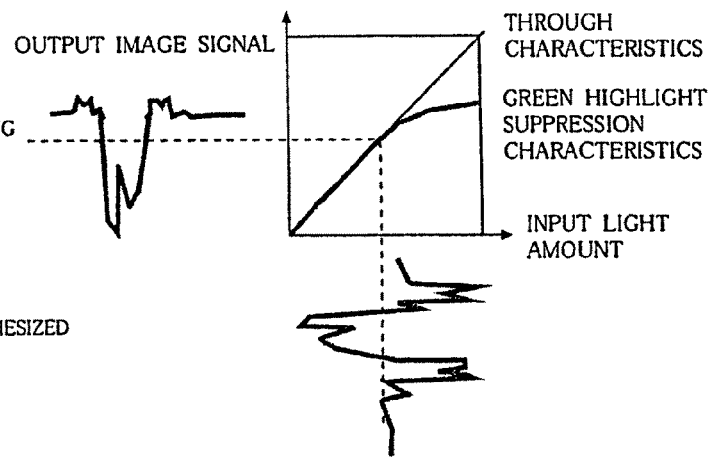
Figure 19C:
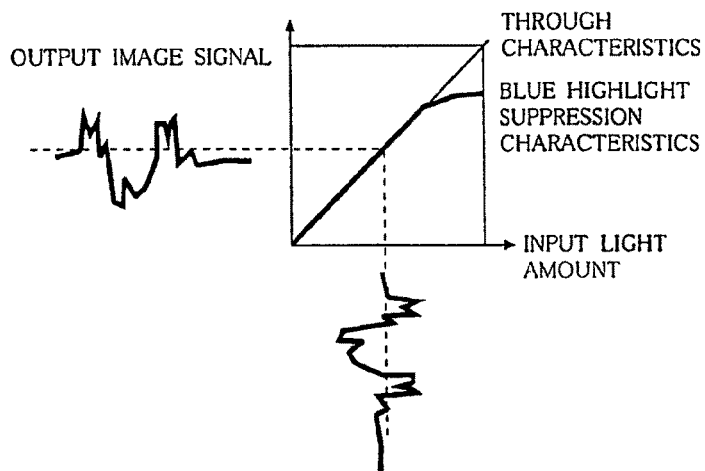

FIGS. 19 show highlight-suppressed image signals produced and acquired in the respective color channels. FIG. 19(*a*) shows the signal in the red channel, FIG. 19(*b*) shows the signal in the green channel, and FIG. 19(*c*) shows the signal in the blue channel.

As shown in these drawings, the highlight-suppressed image signal is produced in each channel, so that when the highlight portions widely vary in the respective RGB channels, highlight suppression characteristics can be independently set for each channel, and the highlight suppression can be carried out in a most efficient area in each channel.

Then, highlight restore images are produced from the highlight-suppressed image signals of the respective channels, and these can be synthesized to output a final image signal.

As described above, in the highlight suppression image pickup apparatus of the present embodiment, a highlight suppression signal is independently produced in each color channel, and a highlight-suppressed image for each color channel can be produced. Then, images of the respective channels are independently restored from the respective highlight-suppressed images, and they can be synthesized to output a final image signal.

Thus, a highlight-suppressed image can be independently produced in each channel, and even when the highlight portions widely vary in the respective channels, it is possible to obtain a more vivid high-quality final image.

[Fifth Embodiment]

A fifth embodiment of a highlight suppression image pickup apparatus of the present invention will next be described referring to FIGS. 20 and 22.

Figure 20:
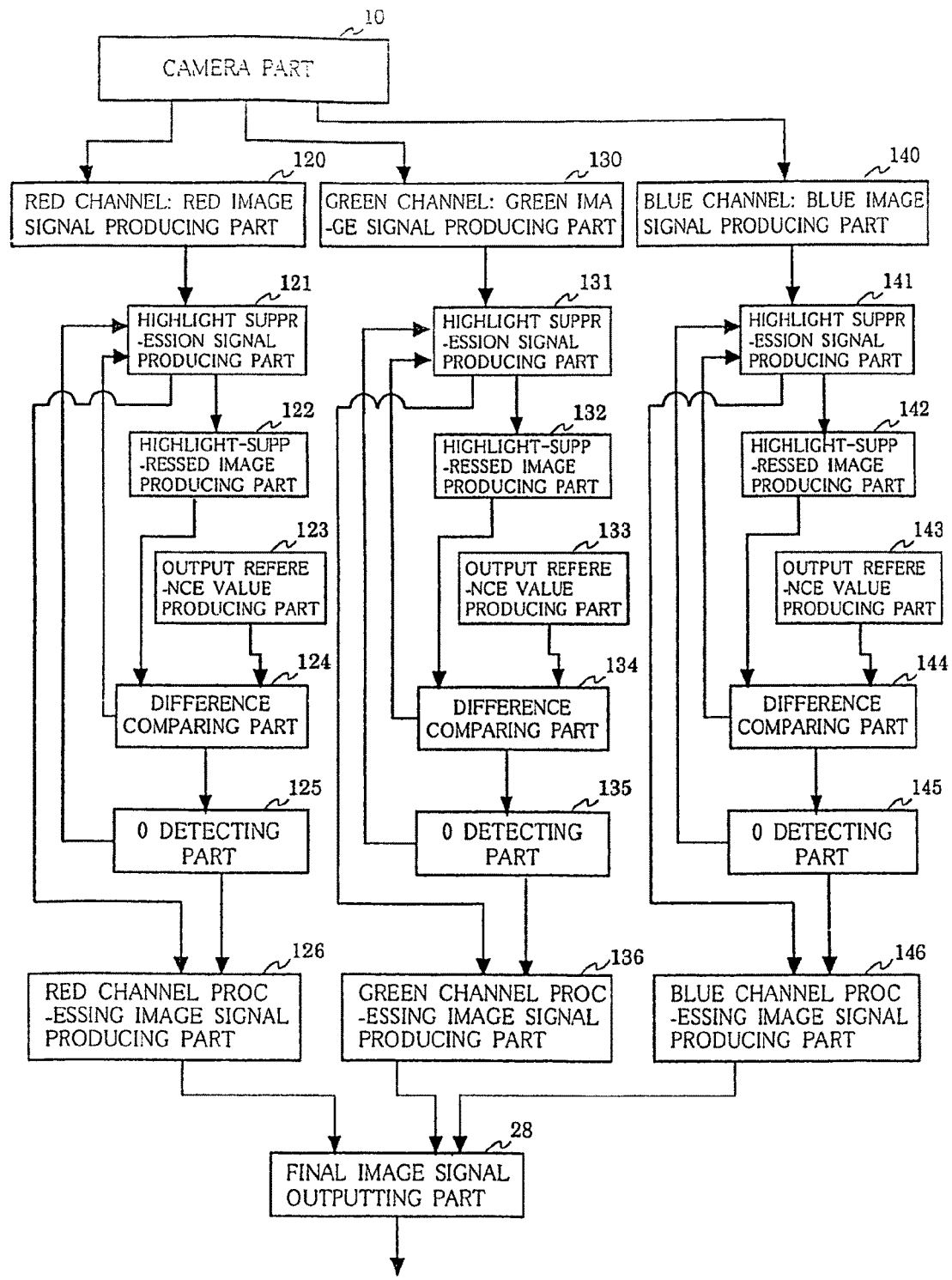
FIG. 20 is a block diagram showing the schematic configuration of a highlight suppression image pickup apparatus according to a fifth embodiment of the present invention.
Figure 21A:
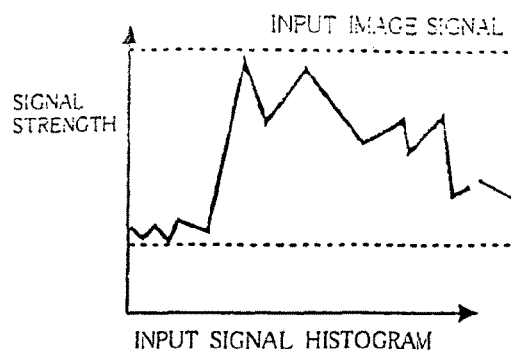
Figure 21B:
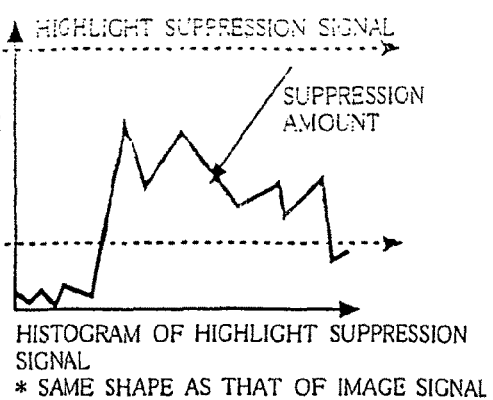
Figure 21C:
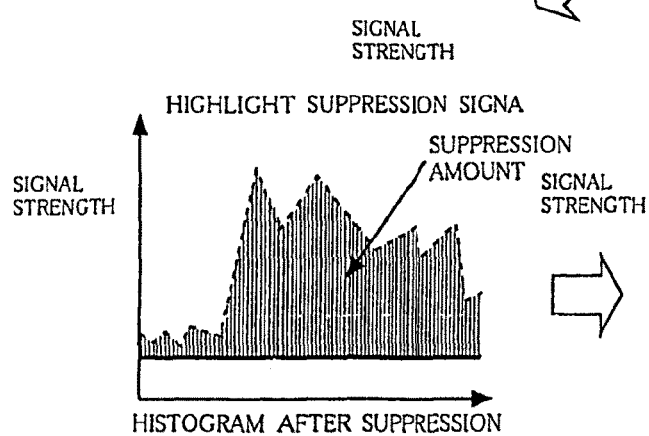
Figure 21D:
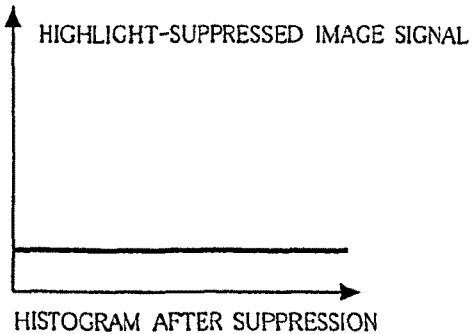
Figure 21E:
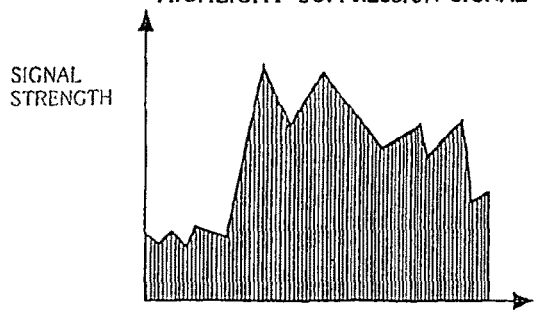

FIG. 20 is a block diagram showing the schematic configuration of a highlight suppression image pickup apparatus according to the fifth embodiment of the present invention.

FIGS. 21 and 22 are graphs showing image signals and highlight suppression signals obtained in the highlight suppression image pickup apparatus according to the present one embodiment. In each of FIGS. 21 and 22, (a) shows an input image signal, (b) shows a highlight suppression signal, (c) shows the suppression amount of the highlight suppression signal, (d) shows a histogram of the highlight suppression signal after suppression, and (e) shows an image signal produced from the suppression amount of the highlight suppression signal.

The highlight suppression image pickup apparatus of the present embodiment shown in these drawings is a further modification of the fourth embodiment in which a highlight-suppressed image can be produced and acquired in each color channel, wherein the output of a highlight-suppressed image produced on the basis of the highlight suppression signal produced and acquired in each channel is suppressed to a predetermined reference value, and an image signal is produced from a signal indicating the amount of this suppression and output as a final highlight-suppressed image.

In this case, for the highlight portion in the highlight-suppressed image produced on the basis of the highlight suppression signal, an image signal is produced from the signal indicating the amount of suppression performed to the predetermined reference value. For the lowlight portion therein, an image signal based on the highlight suppression signal is produced. These image signals are synthesized to be output as a final highlight-suppressed image.

More specifically, in the present embodiment, a highlight suppression signal is produced from each color channel, and each highlight suppression signal is suppressed until the output of each pixel in the relevant color channel reaches a predetermined value (reference value). The amount of the suppression is taken out to produce a new image signal.

That is, suppression is implemented until a histogram of the output of the highlight-suppressed image becomes substantially flat, and the amount of this suppression can be taken out as a new image signal. Then, this is carried out in each color channel, such that new image signals of RGB can be extracted. What is suppressed at this point and has been called the image signal so far loses information on the image. Then, the intensity of input light is uniformed on a CCD plane, and the highlight suppression signal will take charge of image information.

Here, as has been shown in the first embodiment, the active filters can be stacked on a plurality of stages to form multiple layers, which permits the dynamic range of light transmission to be selected as desired. Thus, if the dynamic range of light transmission of the active filter is set larger than the dynamic range of a general CCD, the method of the present embodiment is highly effective in which the suppression amount signal described above is used as final image information.

In this case, the CCD no longer serves as an imaging element but serves as a light sensor, and it is possible to use a part of signal output characteristics with respect to the light intensity of the CCD where gradation decomposition is the best. Moreover, the amount of light that finally reaches is constant, so that, for the imaging element CCD itself, sensitivity is important and the dynamic range may be low.

In other words, in the present embodiment, the image is produced by the active filter for controlling the amount of transmitted light rather than by the CCD which is an imaging element.

Then, it is possible to produce a highlight suppression signal by which the image output from the CCD in the characteristic portions as described above becomes constant.

Thus, in the present embodiment, the highlight suppression signal for suppressing the active filter can serve as a new image signal, thereby making it possible to express an image with great latitude without being limited by the CCD.

In addition, in the present embodiment as described above, since the CCD is only exposed to a given intensity of light, it is preferable to design and use a CCD having a good differential sensitivity at a particular intensity of light. Moreover, in such a design, light with small latitude is dealt with from the viewpoint of the CCD, so that the dynamic range may be extremely narrow, manufacturing costs of the CCD can be reduced, and the development thereof can be easily implemented. Naturally, it is sufficiently possible to use the existing CCD as it is.

Furthermore, the active filter can use not only the thickness of color but also the transmission time of light to control the amount of light (refer to the first embodiment), thereby making it possible to provide an image with better quality. Naturally, the image from the suppression signal can be combined with the output image from the CCD to produce a better image output incorporating the characteristics of the two.

The nature of the highlight suppression signal (suppression amount signal) in the present embodiment will hereinafter be explained using equations.

It is to be noted that an input image acquired in the camera part is an optical image and has not yet converted to an electronic signal, and can not therefore be expressed as a relational expression in the same field as electronic signals such as other highlight suppression signals and highlight-suppressed image signals. Therefore, explanation will be given below in a situation where information energy is defined and used as a common field for obtaining relational expressions, and these are converted into fields of information energy. Here, for simplification of explanation, amounts expressed in the following equations are defined as information energy.

The information energy $f(x,y,R,G,B)$ of an input image immediately before the active filter can be decomposed into three colors as follows, and the information energy can be expressed by Equation 1 below:

$$f(x,y,R,G,B) = fr(x,y,R), fg(x,y,g), fb(x,y,b) \qquad \text{Equation 1}$$

wherein fr(x,y,R), fg(x,y,g), fb(x,y,b) are information energy components of the respective input images.

All the color channels are similar, so that when an attention is focused on, for example, the red channel, an equation for processing an input signal of the red channel in accordance with the highlight suppression signal for the red channel to produce a highlight-suppressed image of the red channel is Equation 2 below in the information energy field:

$$fr(x,y,R)=gr(x,y,R) \cdot Kr(x,y,R) \qquad \text{Equation 2}$$

wherein fr(x,y,R) which has been decomposed indicates information energy of the red channel input signal, gr(x,y,R) indicates information energy of the highlight suppression signal for the red channel, Kr(x,y,R) indicates information energy of the highlight-suppressed image output signal for the red channel, x,y are image plane coordinates of the red channel, and R indicates information energy of the signal strength of the red channel. The same goes for the other channels.

Moreover, the meaning of Equation 2 above is as follows.

The information energy fr(x,y,R) of the original image is broken into gr(x,y,R) and Kr(x,y,R) by conversion from light energy to electronic energy. Therefore, in order to reproduce the information energy fr(x,y,R) of the original image information, both gr(x,y,R) and Kr(x,y,R) that have been broken into are necessary, so that original image information can be reproduced from gr(x,y,R) and Kr(x,y,R). This is common in all of the first to fourth embodiments described above including the present embodiment.

If the information energy fr(x,y,R) of the input signal of the red channel is subtracted by the information energy gr(x,y,R) of the highlight suppression signal for the red channel (if highlight suppression conversion processing is performed), the information energy Kr(x,y,R) of the highlight-suppressed image output for the red channel can be obtained.

Furthermore, the present embodiment is a specific case indicated by the relation of Equation 2 above. When the information energy Kr(x,y,R) of the highlight image output signal in the red channel is set to a constant value Kr, Equation 2 above will result in Equation 3 below.

$$Kr=fr(x,y,R)/gr(x,y,R) \qquad \text{Equation 3}$$

If this Equation 3 is transformed, the result is Equation 4 below.

$$gr(x,y,R)=fr(x,y,R)/Kr \qquad \text{Equation 4}$$

As indicated by this Equation 4, the information energy fr(x,y,R) of the input image of the red channel multiplied by a constant number (1/Kr) is equal to the information energy gr(x,y,R) of the highlight suppression signal for the red channel. Otherwise, the information energy gr(x,y,R) of the highlight suppression signal for the red channel is in proportion to the information energy fr(x,y,R) of the input image of the red channel.

At this point, the proportionality constant (1/Kr) is fixed, and gr(x,y,R) is exactly the information energy possessed by the original image of the red channel.

The information energy Kr(x,y,R) of the highlight-suppressed image output for the red channel indicated in Equation 4 is a constant number Kr, and Kr(x,y,R) has lost the image information.

Equation 4 completely holds true for a green channel gg(x,y,G) and a blue channel gb(x,y,G), as indicated by Equations 5 and 6 below.

$$gg(x,y,G)=fg(x,y,G)/Kg \qquad \text{Equation 5}$$

$$gb(x,y,B)=fb(x,y,B)/Kb \qquad \text{Equation 6}$$

Moreover, it is not the highlight image output signal Kr(x,y,R) of the red channel but actually the highlight suppression signal gr(x,y,R) for the red channel that serves as the final highlight image output signal of the red channel in the present embodiment.

The signals synthesized from the color channel outputs are as indicated by Equations 7 and 8 below.

$$g(x,y,R,G,B)=fr(x,y,R)/K(r,g,b) \qquad \text{Equation 7}$$

$$g(x,y,R,G,B)=fr(x,y,R)/Kr+fg(x,y,G)/Kg+fb(x,y,B)/Kb \qquad \text{Equation 8}$$

This signifies in the present embodiment that the highlight suppression signal is exactly the input image.

Furthermore, in order to achieve the equations as described above, the highlight suppression image pickup apparatus of the present embodiment has a configuration as shown in FIG. 20.

As shown in FIG. 20, in the present embodiment, there are provided a red image signal producing part 120, a green image signal producing part 130 and a blue image signal producing part 140 corresponding to the respective color channels (RGB), as in the fourth embodiment. The image signal producing parts comprise highlight suppression signal producing parts 121, 131 and 141, highlight-suppressed image producing parts 122, 132 and 142 and color channel processing image producing parts 126, 136 and 146, respectively. Each of the highlight suppression signal producing parts 121, 131 and 141 comprises an active filter corresponding to each color (not shown).

Furthermore, in the present embodiment, the respective color channels comprise output reference value producing parts 123, 133 and 143, difference comparing parts 124, 134 and 144, and difference 0 detecting parts 125, 135 and 145.

Then, the highlight-suppressed images produced in the respective color channels are synthesized in a final image outputting part 28 to be output as a final highlight-suppressed image.

In the highlight suppression image pickup apparatus of the present embodiment having such a configuration, a highlight-suppressed image is produced and output as follows.

First, an input image acquired in a camera part 10 is converted into image signals for the respective color channels in the red image signal producing part 120, the green image signal producing part 130 and the blue image signal producing part 140. Then, highlight suppression signals are produced in the highlight suppression signal producing parts 121, 131 and 141 comprising the active filters, and on the basis of these highlight suppression signals, highlight-suppressed image signals are produced in the highlight-suppressed image producing parts 122, 132 and 142.

Moreover, in the output reference value producing parts 123, 133 and 143 of the respective color channels, output reference values predetermined for the respective channels are produced, and the highlight-suppressed image signal is compared with the output reference value as to the difference therebetween for each channel in each of the difference comparing parts 124, 134 and 144.

Furthermore, in the difference 0 detecting parts 125, 135 and 145, the suppression amount of the highlight suppression signal is adjusted until the difference between the highlight-suppressed image signal and the output reference value becomes 0. When the difference has become 0, the highlight-suppressed image signals which have gone through the difference 0 detecting parts 125, 135 and 145 are synthesized with the original highlight suppression signal, thereby producing processing image signals for the respective channels. Further, the processing image signals for the respective color channels are synthesized in the final image outputting part 28, thereby producing a final image signal.

At this point, for the highlight portion in the input image acquired in the camera part 10, an image is produced from the highlight suppression signal (suppression amount signal). For the lowlight portion therein, an image is produced from the image signal suppressed by the highlight suppression signal. These images can be synthesized to output an image.

In this manner, a sufficiently high image output is produced in the highlight portion, and the lowlight portion can be raised to sensitivity of the bare CCD, thereby making it possible to obtain a wide range of image outputs from the highlight to lowlight. At this point, the latitude of a displayed image is improved to such a degree that it is limited by the performance on a display device side rather than an imaging side. That is, even when an image is picked up against light, images of the sun itself and of details of shaded portions are all picked up at the same time, and then expression is permitted to the limit of the performance on the display device side, such that an almost ideal image pickup apparatus can be constructed.

FIGS. 21 and 22 show image signals produced from the suppression amount of the highlight-suppressed image obtained in the present embodiment.

In the case of the signals shown in FIGS. 21, the highlight suppression signal itself is used as the image signal.

First, when the input image signal as shown in FIG. 21(*a*) is highlight-suppressed, the suppression amount of the highlight suppression signal (FIG. 21(*b*)) used for this purpose is controlled (FIG. 21(*c*)) until the highlight-suppressed image signal becomes flat as shown in FIG. 21(*d*). Then, the obtained highlight suppression signal (FIG. 21(*c*)) is used as a final image signal (FIG. 21(*e*)).

Thus, in the example shown in FIGS. 21, the highlight suppression signal is used as it is for the image signal for all of the highlight and lowlight portions in the image, and output as the final image signal.

As to the signals shown in FIGS. 22, the highlight suppression signal itself is used as the image signal, and this image signal is synthesized with the suppressed-image signal suppressed by the highlight suppression signal for use as a final image signal.

First, when the input image signal as shown in FIG. 22(*a*) is highlight-suppressed, the suppression amount of the highlight suppression signal (FIG. 22(*b*)) used for this purpose is controlled (FIG. 22(*c*)) in the highlight portion of the image until the highlight-suppressed image signal becomes substantially flat as shown in FIG. 22(*d*). Then, a portion (lowlight portion) of the highlight-suppressed image signal is synthesized with the obtained highlight suppression signal (FIG. 22(*c*)) as shown in FIG. 22(*d*), and the resulting signal is used as a final image signal (FIG. 22(*e*)).

Thus, in the example shown in FIGS. 22, the highlight suppression signal is used as it is for the image signal for the highlight portion, and the image suppressed by the highlight suppression signal is used for the lowlight portion. Then, the image signals of the highlight and lowlight portions are synthesized and output as a final image signal.

As described above, according to the highlight suppression image pickup apparatus of the present embodiment, a highlight suppression signal is produced from one color channel or two or more color channels, and this suppression signal is used to implement suppression until the output in the relevant color channel reaches a prescribed value, and then the amount of suppression can be taken out to produce a new image signal. Then, this is carried out in each color channel of RGB, such that new image signals of RGB can be extracted. What is suppressed at this point and has been called the image signal so far loses information on the image. Then, the intensity of input light is uniformed on an imaging plane (CCD plane), and the highlight suppression signal indicating the suppression amount will take charge of the image information.

Thus, in the present embodiment, a desired highlight-suppressed image can be produced not by the imaging element comprising the CCD but by the active filter for controlling the amount of transmitted light.

In addition, while the preferred embodiments of the highlight suppression image pickup apparatus of the present invention have been described above, the highlight suppression image pickup apparatus according to the present invention is not merely limited to the embodiments described above. It goes without saying that various modifications can be made within the scope of the present invention.

Figure 23:
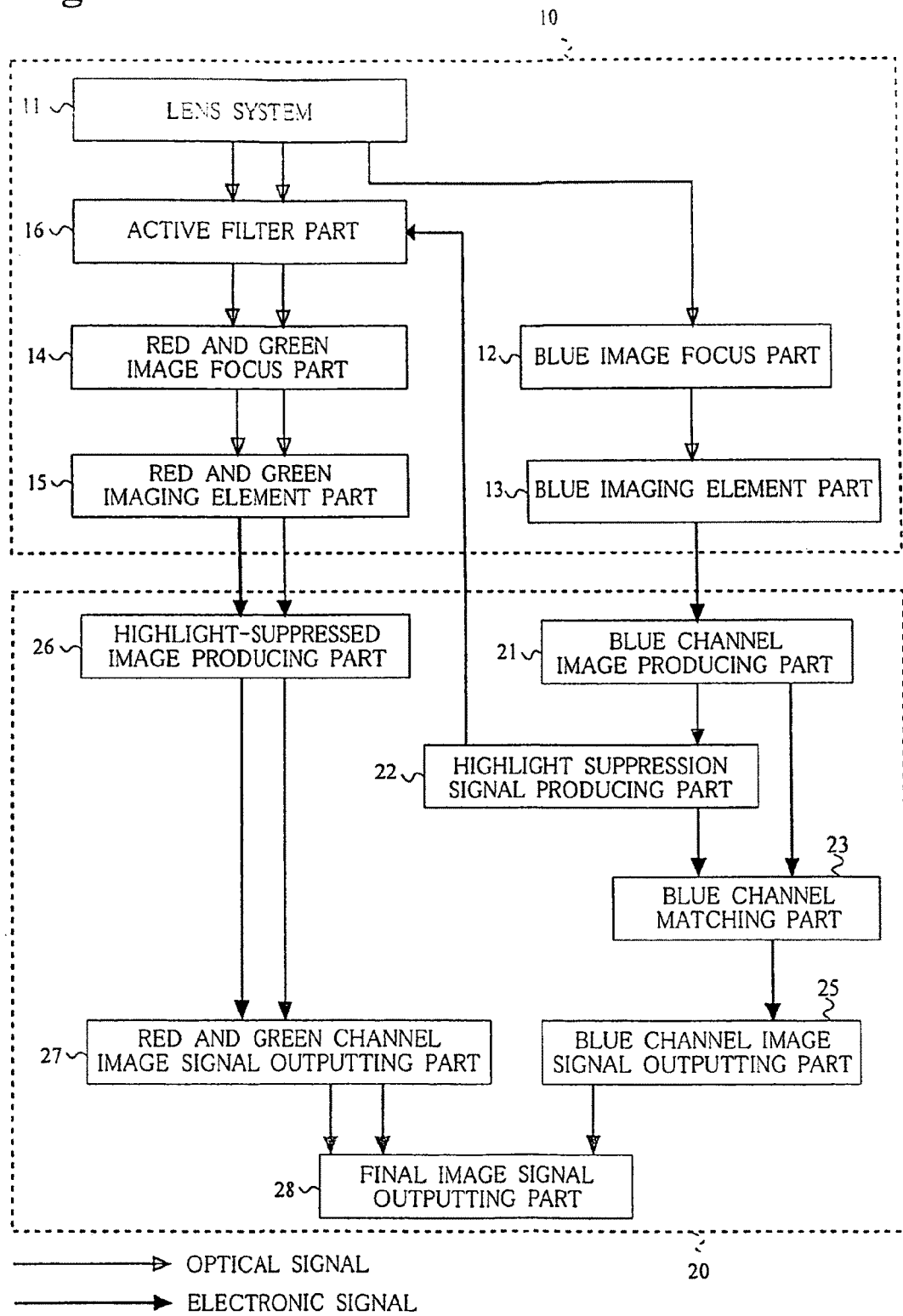
FIG. 23 is a block diagram showing the schematic configuration of a highlight suppression image pickup apparatus according to an alternative embodiment of the present invention.
Figure 24:
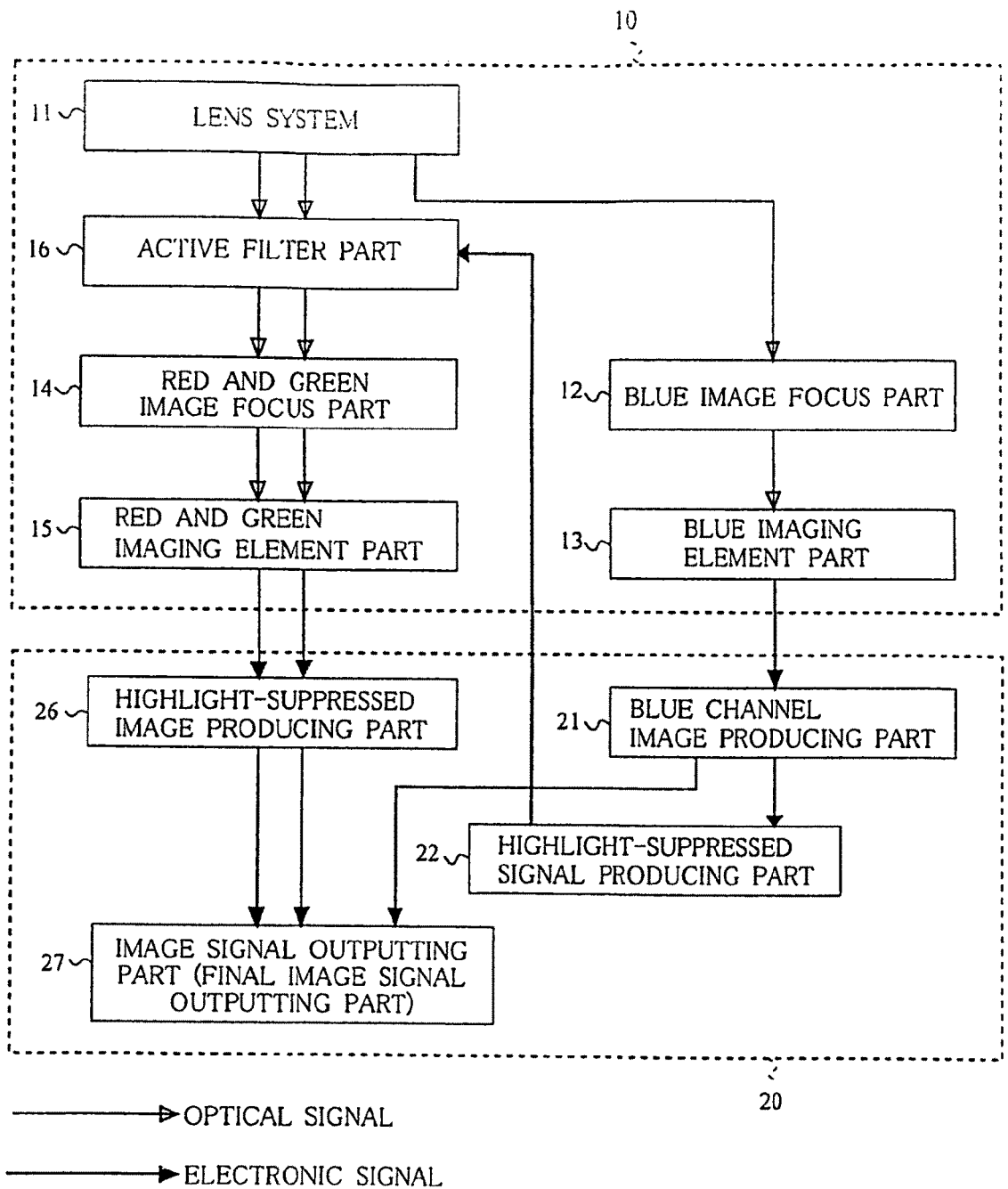
FIG. 24 is a block diagram showing the schematic configuration of a highlight suppression image pickup apparatus according to an alternative embodiment of the present invention.

For example, as shown in FIGS. 23 and 24, part of the configuration of the image pickup apparatus can be selectively omitted, and the configuration of the apparatus can be simplified.

In the example shown in FIG. 23, the restore signal producing part 24 (see FIG. 1) for producing the restore signal from the highlight suppression signal is omitted. In this case, the final highlight-suppressed image is an image having suppression characteristics without restoration by the restore signal (see FIG. 9(*c*)).

Moreover, in the example shown in FIG. 24, the blue channel matching part 23 and the blue channel image signal outputting part 25 (see FIG. 1) for electronically controlling the blue channel image are further omitted, so that the optical highlight suppression of the red, green and blue channel images can only be carried out.

INDUSTRIAL APPLICABILITY

As described above, according to the highlight suppression image pickup apparatus of the present invention, in an image with great latitude or an image having an intense highlight portion, highlight components can be optically and electronically removed and suppressed before light reaches an imaging element, so that it is possible to produce an image in which the effects of the highlight are essentially suppressed and removed, and an image in which the highlight is restored without deteriorating the image quality.

Thus, in the case of picking up an image affected by the highlight, such as an image of the headlights of automobiles or the like at night or in a dark place or an image with high contrast in outer space, particularly bright parts in an image are removed or suitably suppressed, for example, in an image where there are sunlight and dark parts therearound in the outer space, or in an image of a road at night where there are parts corresponding to the headlights and dark parts therearound. Thereby, it is possible to acquire a high-quality image in which the dark portion is not affected by the highlight.

The invention claimed is:

1. a highlight suppression image pickup apparatus: comprising:
   a camera part provided with a lens optical system, an active filter part which is disposed in a vicinity of a focal plane of the camera part and which can, the active filter part being configured to control an amount of transmitted light,
   a light sensing means which senses a light transmission amount of the active filter part,
   a highlight suppression signal producing part which produces a highlight suppression signal which controls the light transmission amount of the active filter part such that an amount of light sensed by the light sensing means becomes a predetermined reference value, wherein the highlight suppression signal which controls the light transmission amount of the active filter part is an image signal, wherein the highlight suppression signal producing part produces the highlight suppression signal on a basis of an image output from at least one color channel of one or two or more color channels output from the camera part, the active filter part optically controls, in accordance with the highlight suppression signal, an amount of light transmitted to an imaging plane of each of the color channels, and the image acquired in the camera part is transmitted through the active filter part, is picked up by an imaging element of each color channel and is output as a highlight-suppressed image in which highlight is optically controlled.

2. The highlight suppression image pickup apparatus according to claim 1, wherein, of the highlight-suppressed image produced on a basis of the highlight suppression signal, for a high-light portion, the image signal is produced from a signal from a highlight suppression signal which controls the light transmission amount of the active filter part such that the amount of light sensed by the light sensing means becomes the predetermined reference value, and for a lowlight portion, the image signal is produced by transmitting through the active filter part and picked up by the imaging element for the each color channel, and the image signal for the high-light portion and the image signal for the lowlight portion are then synthesized and output as a final highlight-suppressed image.

3. The highlight suppression image pickup apparatus according to claim 1, wherein the active filter part optically controls an amount of light transmitted to each portion of the focal plane of each color channel in predetermined pixel units or predetermined image area units in accordance with the highlight suppression signal.

4. The highlight suppression image pickup apparatus according to claim 1, wherein the active filter part is provided in the vicinity of the focal plane of the camera part.

5. The highlight suppression image pickup apparatus according to claim 1, wherein the camera part comprises the focal plane within the lens optical system, and the active filter part is provided in the vicinity of the focal plane within the lens optical system.

6. The highlight suppression image pickup apparatus according to claim 1, wherein the camera part comprises
an image acquiring channel part which acquires a desired image, and
a dedicated channel part which acquires an image used to produce the highlight suppression signal and which is different from the image acquiring channel part, and the highlight suppression signal producing part produces, on a basis of an image output acquired in the dedicated channel part, the highlight suppression signal corresponding to the image obtained in the image acquiring channel part.

7. The highlight suppression image pickup apparatus according to claim 1, further comprising an electronic control part which electronically suppresses an image output from the camera part on a basis of the highlight suppression signal, wherein the image output acquired in the camera part is optically highlight-suppressed via the active filter, and output as a highlight-suppressed image in which the highlight is electronically suppressed.

8. The highlight suppression image pickup apparatus according to claim 1, wherein the highlight suppression signal producing part produces a non-binary highlight suppression signal which indicates gradation, and an image output acquired in the camera part is output as a highlight-suppressed image in which the highlight suppression is gradationally given by the non-binary highlight suppression signal via the active filter part intensely on a highlight side and weakly on a lowlight side.

9. The highlight suppression image pickup apparatus according to claim 8, further comprising a restore signal producing part which produces a restore signal on a basis of the non-binary highlight suppression signal which indicates the gradation, wherein the highlight-suppressed image in which the highlight suppression is gradationally given via the active filter part is restored to a gradation of an original image and then output.

10. The highlight suppression image pickup apparatus according to claim 1, wherein the camera part comprises
an infrared imaging element having sensitivity to infrared rays on a long-wavelength side,
an optical filter which cuts visible light sensitivity of the infrared imaging element, and
a visible light imaging element having sensitivity to visible light, wherein the highlight suppression signal producing part produces the highlight suppression signal on a basis of an image output of visible light output from the camera part, and the image output acquired in the camera part is output as a highlight-suppressed infrared image via the active filter part whose infrared image transmission characteristics are controlled by the highlight suppression signal based on a visible light image.

11. The highlight suppression image pickup apparatus according to claim 1, wherein the active filter part is provided as a composite element integrated with an imaging element of the camera part.

12. The highlight suppression image pickup apparatus according to claim 1, wherein the active filter part has a multilayer structure in which elements for control of the amount of transmitted light are arranged on a plurality of stages.

13. The highlight suppression image pickup apparatus according to claim 1, wherein the active filter part comprises an element which controls the amount of transmitted light in accordance with an intensity of incident light instead of an electronic control.

14. The highlight suppression image pickup apparatus according to claim 1, wherein the active filter part controls a transmission time of the transmitted light to control an amount of light transmitted to the imaging plane of each color channel.

15. The highlight suppression image pickup apparatus according to claim 1, wherein an imaging element provided on the imaging plane of each color channel controls charge storage time in predetermined pixel units or predetermined image area units to control a sensitivity of the imaging plane.

16. The highlight suppression image pickup apparatus according to claim 1, wherein the highlight suppression signal producing part is provided in respective color channels, highlight-suppressed images are produced in the respective color channels, and the produced highlight-suppressed images are synthesized and output as a final highlight-suppressed image.

17. The highlight suppression image pickup apparatus according to claim 2, wherein the highlight suppression signal produced on the basis of the image output from the at least one color channel of one or two or more color channels suppresses an output of a signal in a corresponding channel until the output of the signal in the corresponding channel reaches a predetermined value.

18. The highlight suppression image pickup apparatus according to claim 17, wherein an amount of suppression suppressed on the basis of the image output from the at least one color channel of one or two or more color channels produces a new image signal.

19. The highlight suppression image pickup apparatus according to claim 18, wherein the highlight suppression signal produced on the basis of the image output from the at least one color channel of one or two or more color channels is suppressed until a histogram of an output of the highlight-suppressed image becomes substantially flat.

* * * * *